3,314,452
METHODS OF AND APPARATUS FOR WINDING WIRE
John S. Cartwright, Hopewell Township, Mercer County, Clifford W. Henderson, Princeton Township, Mercer County, George E. Melvin, Hamilton Square, Richard C. Steen, Raritan Township, Hunterdon County, and Edward S. Tice, New Brunswick, N.J., assignors to Western Electric Company, Incorporated, New York, N.Y., a corporation of New York
Filed June 25, 1964, Ser. No. 377,857
27 Claims. (Cl. 140—92.2)

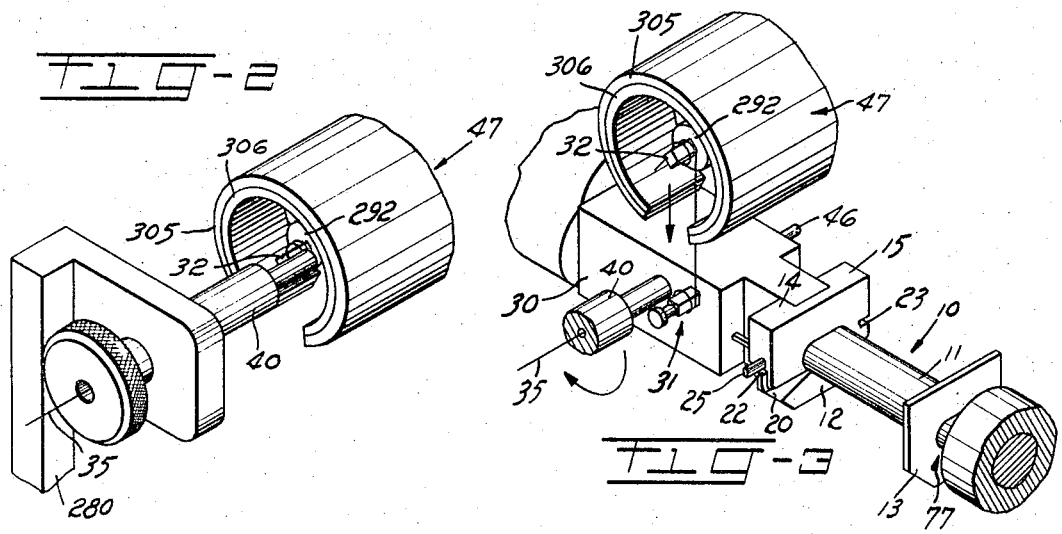

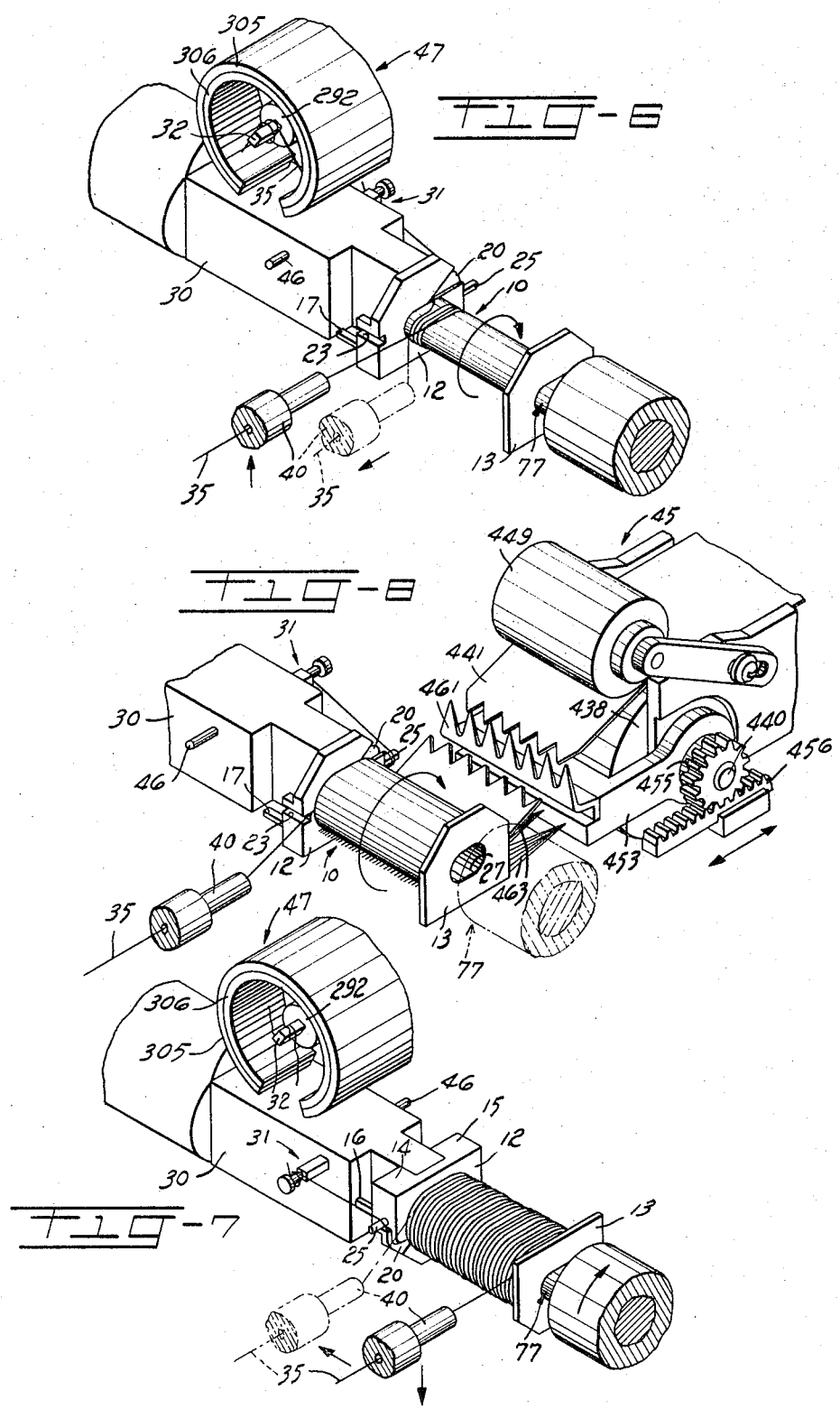

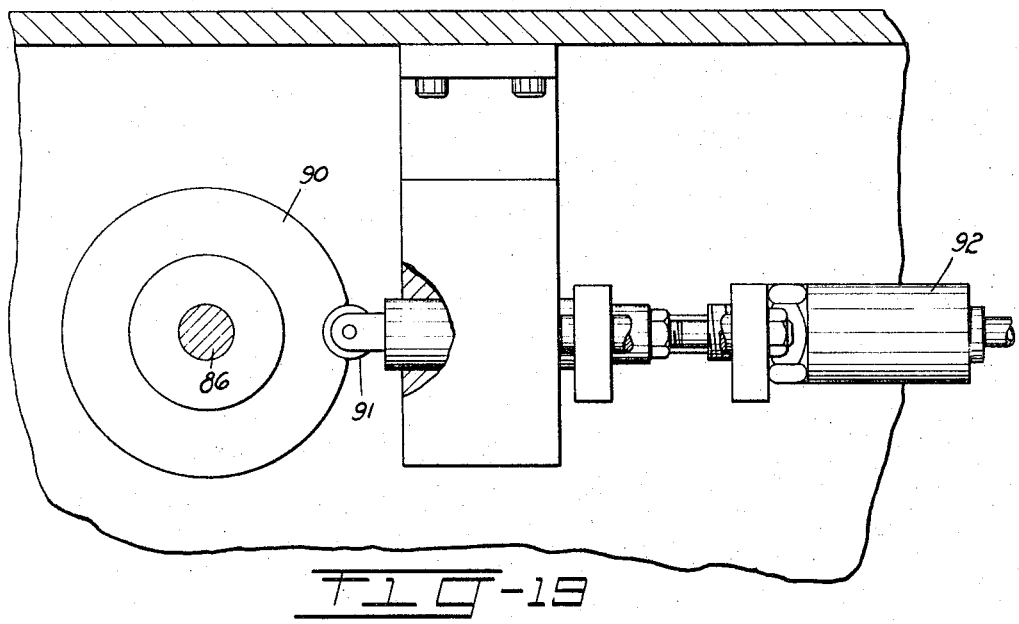
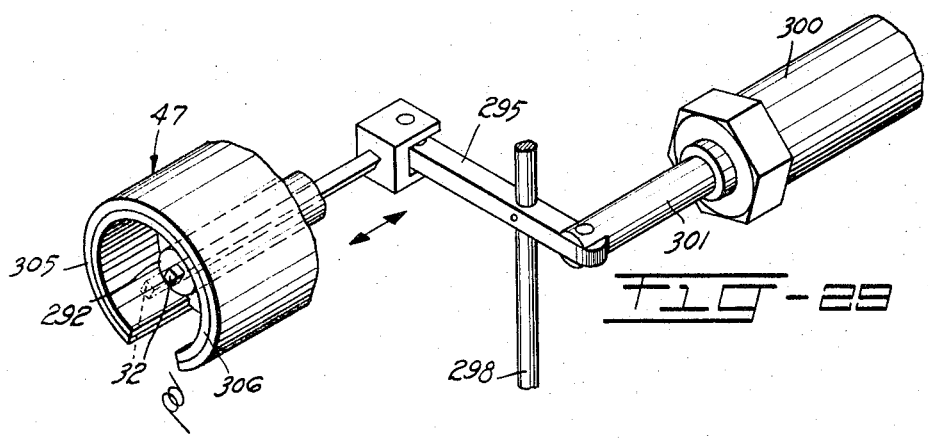
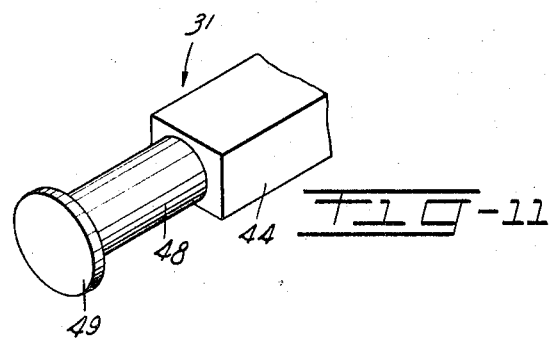

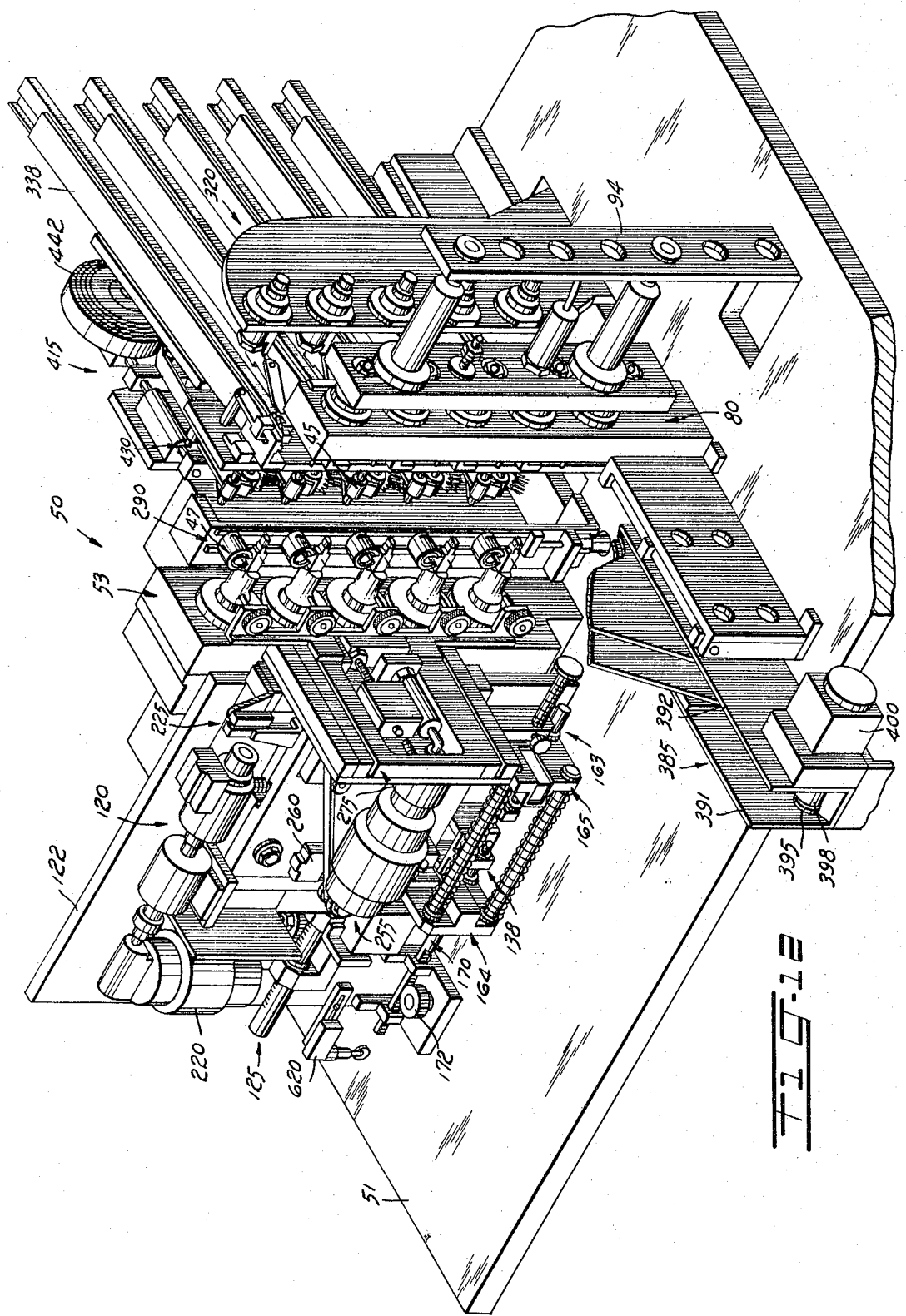

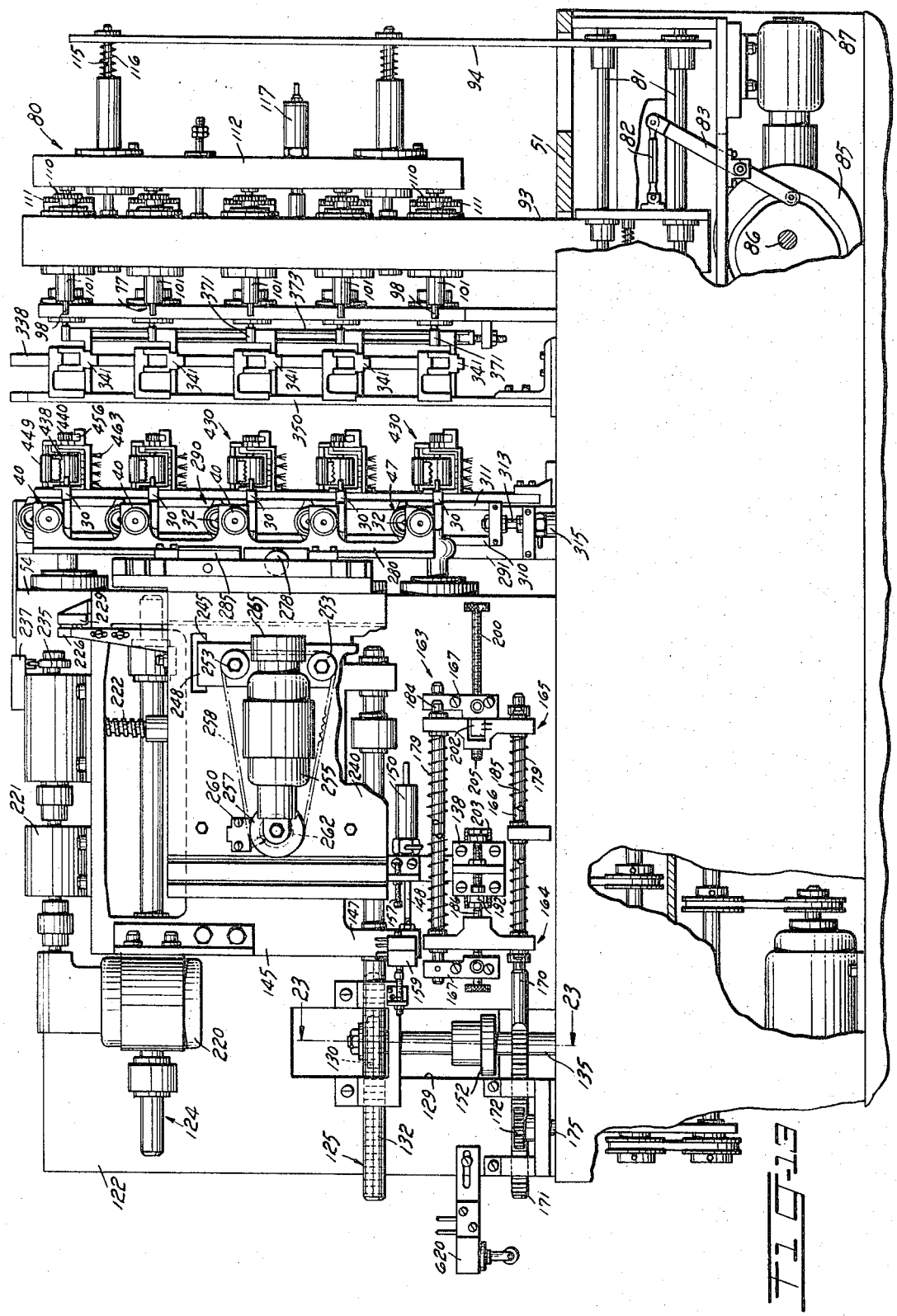

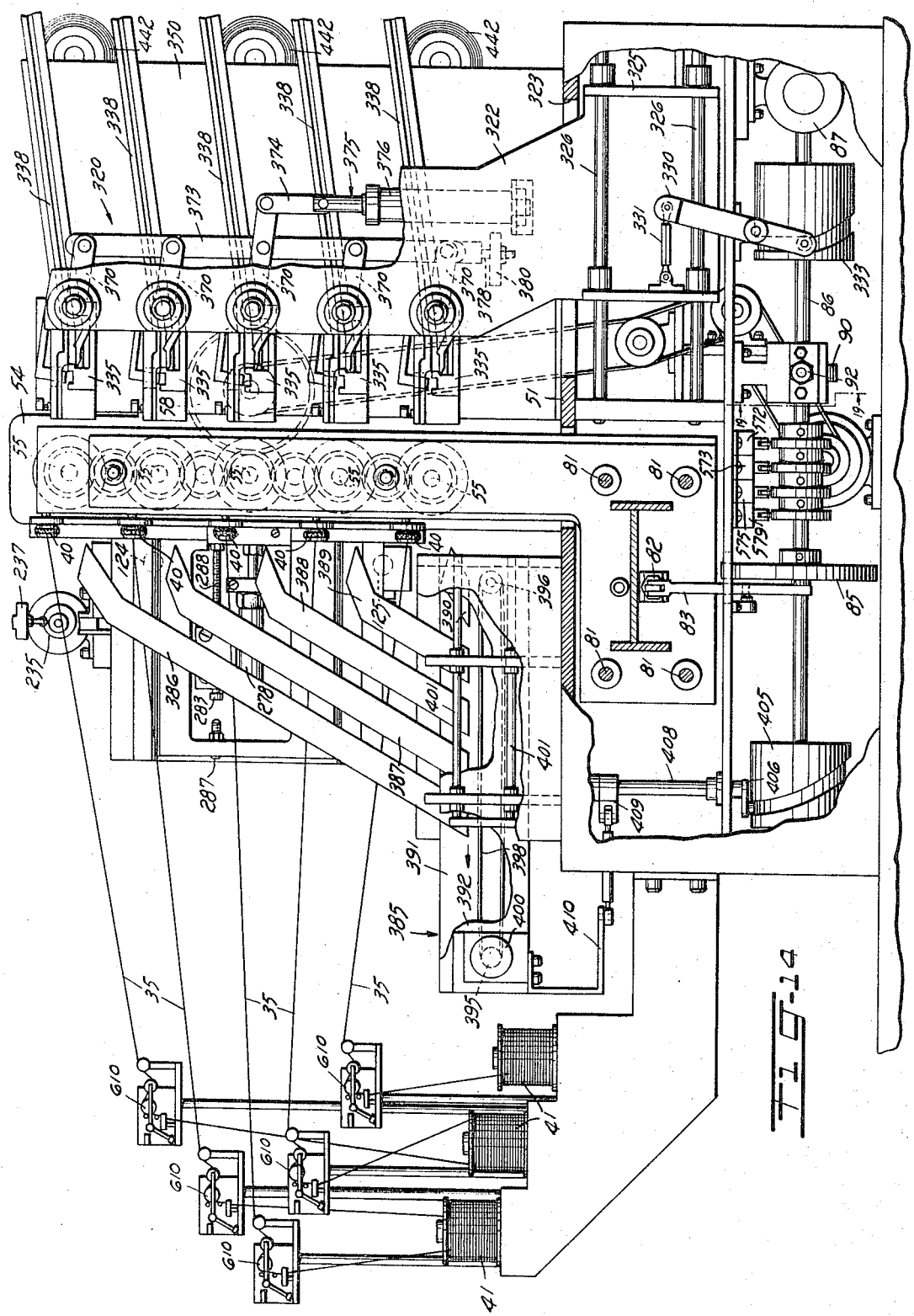

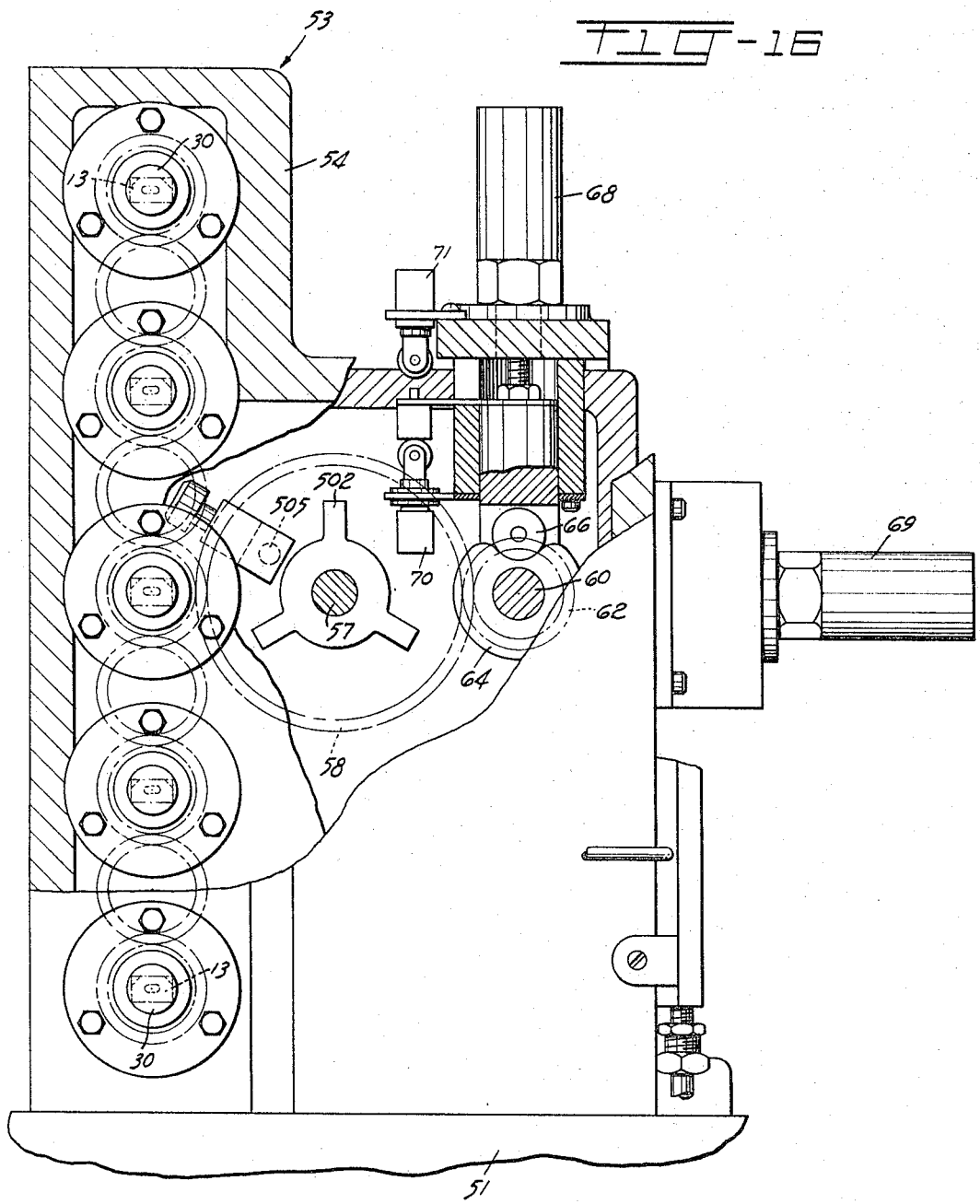

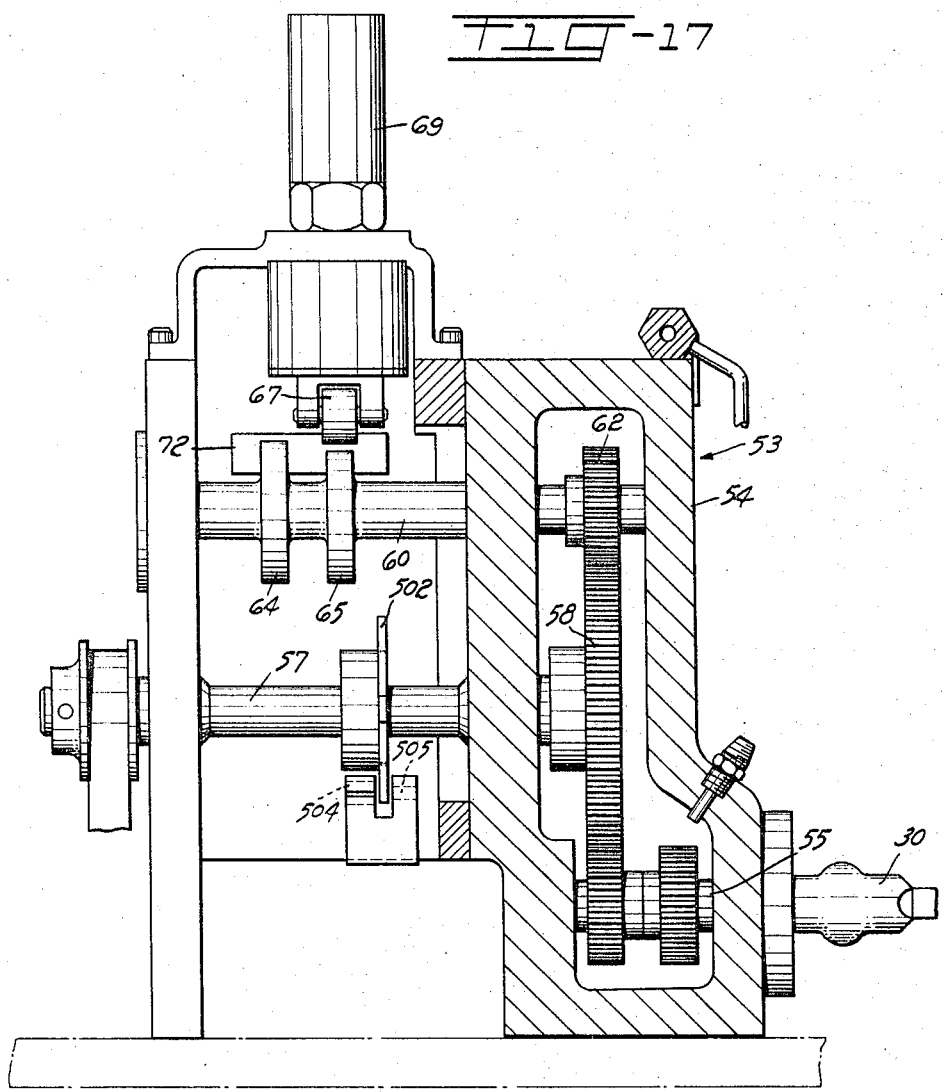

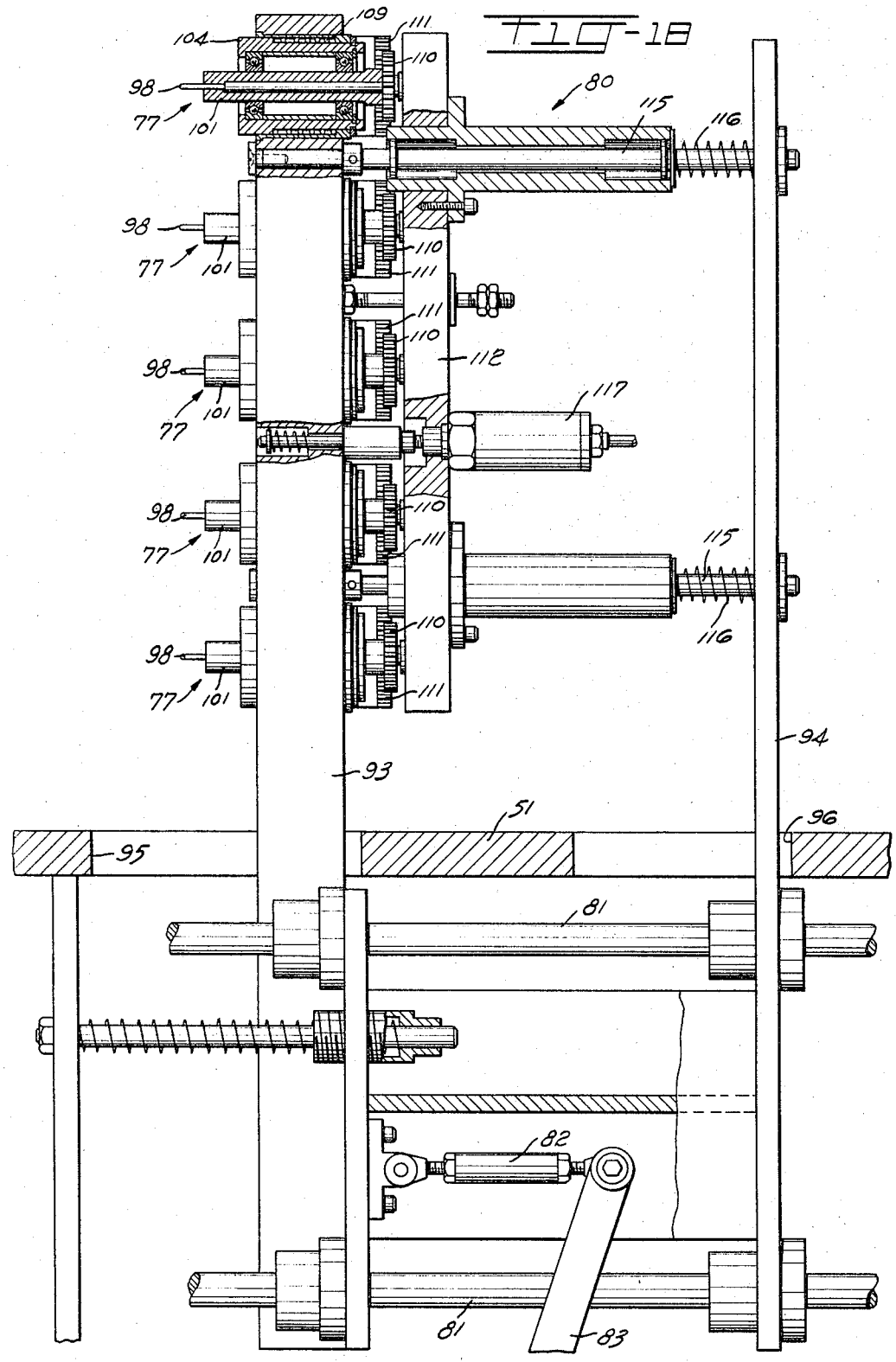

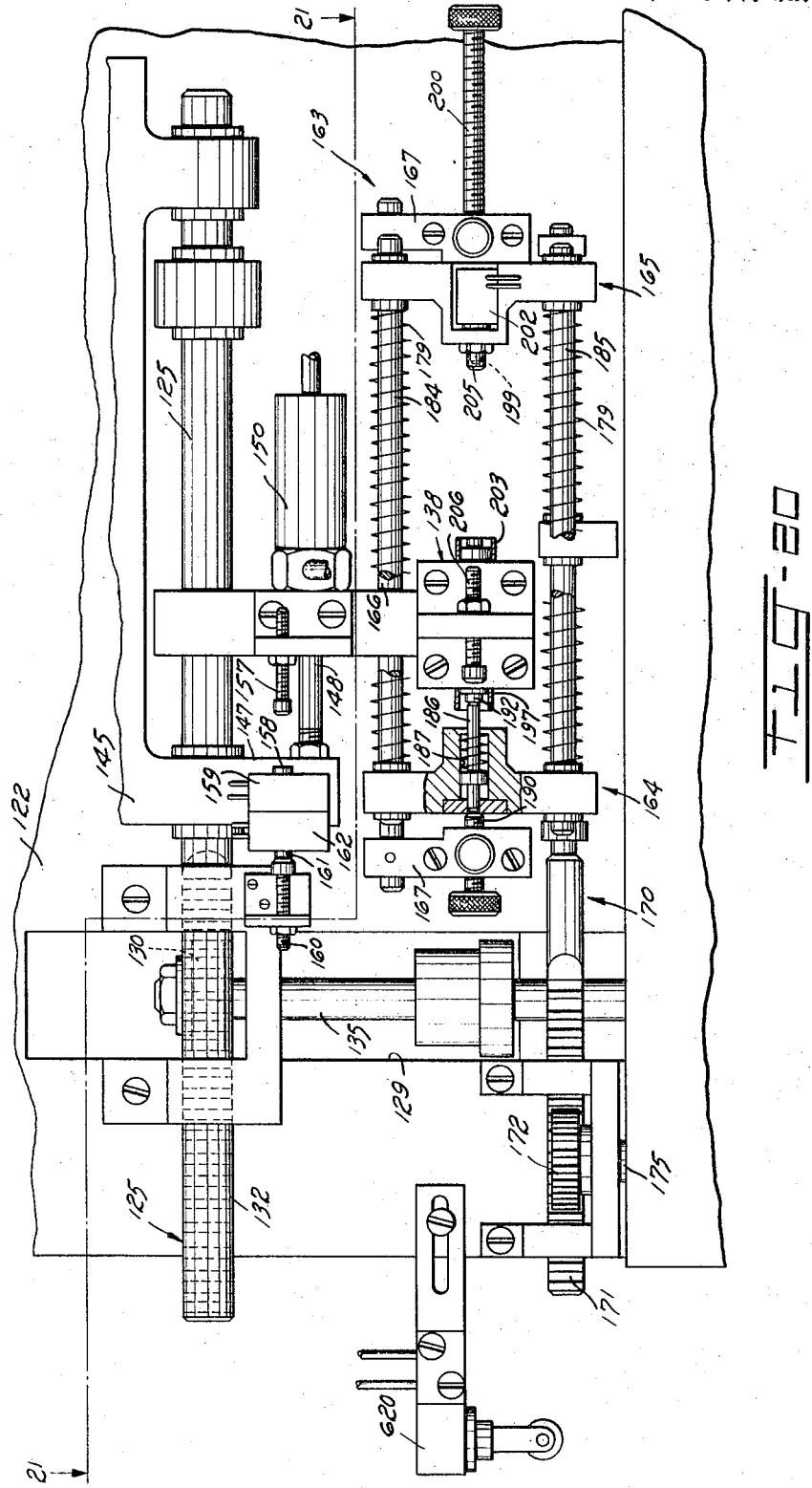

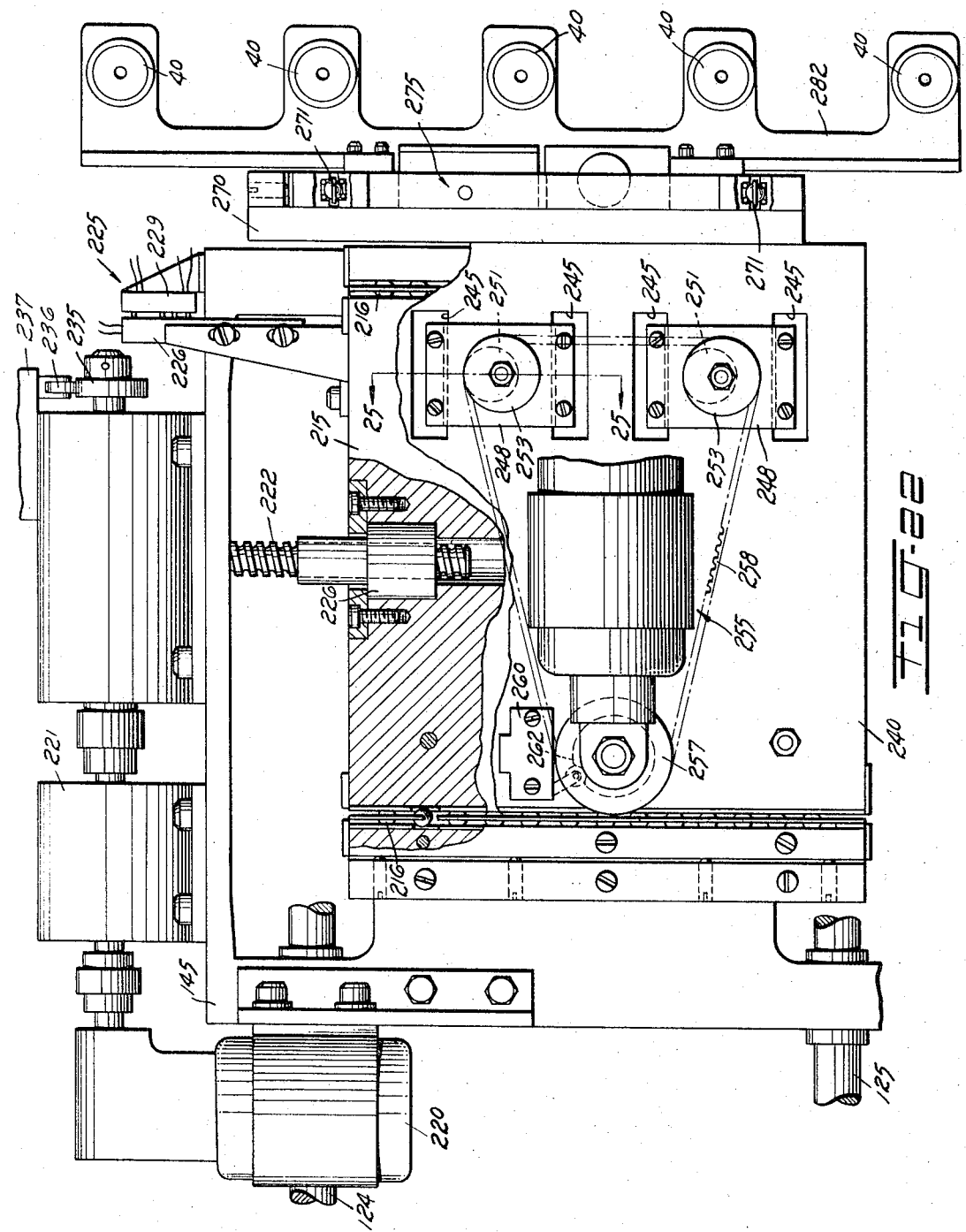

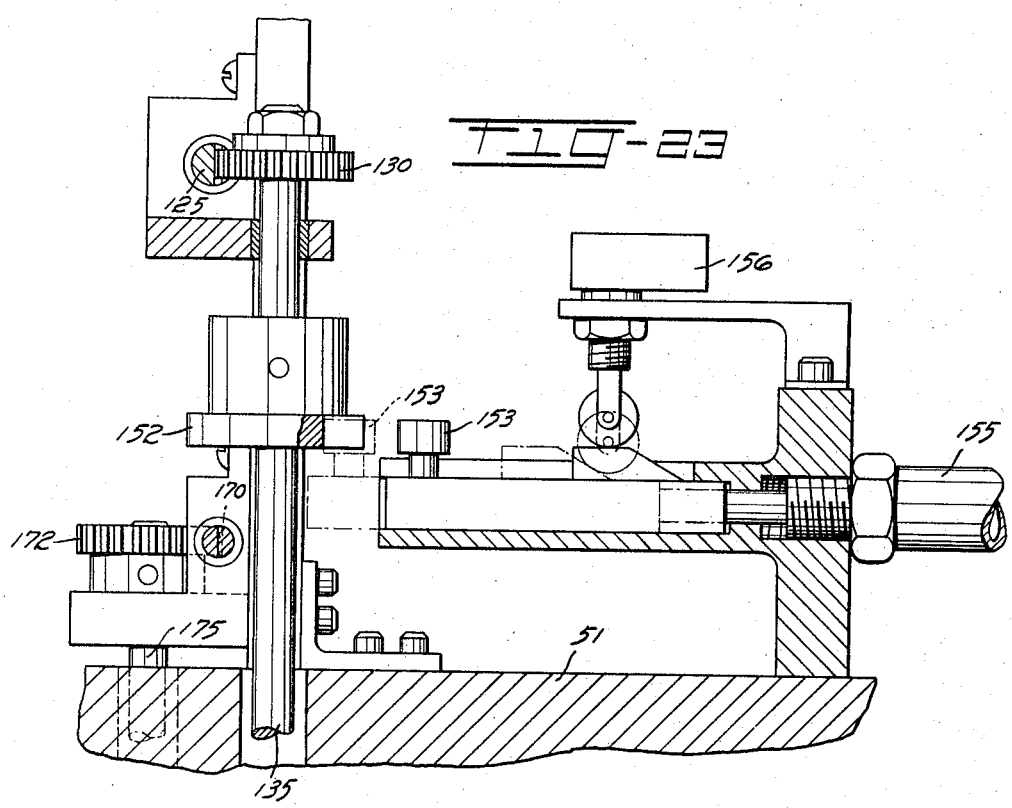
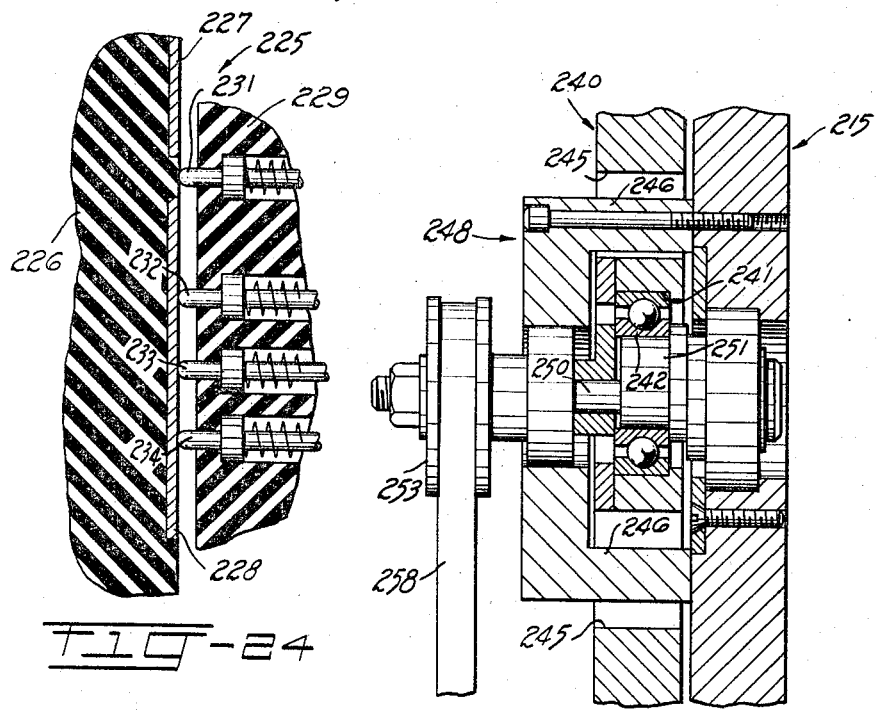

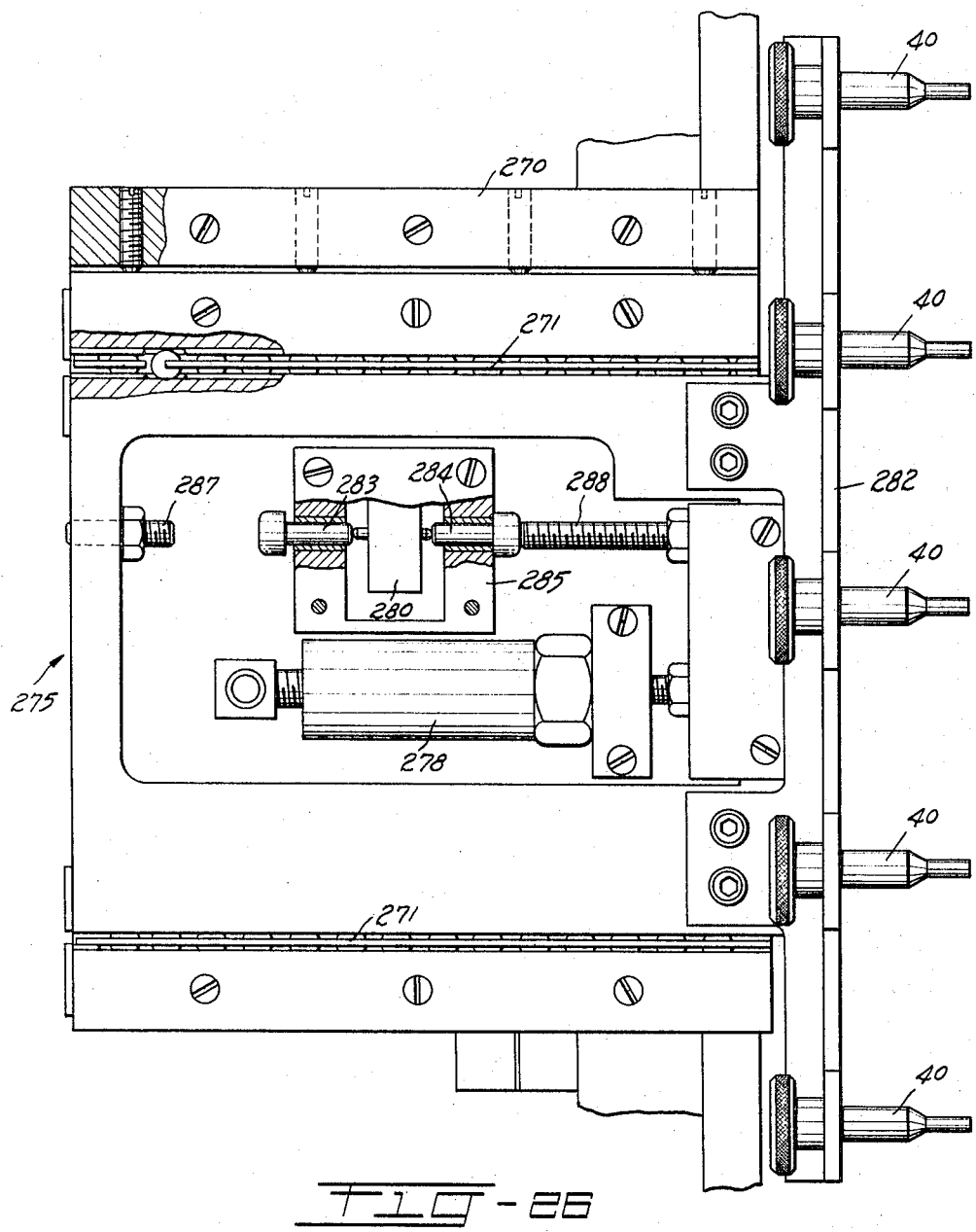

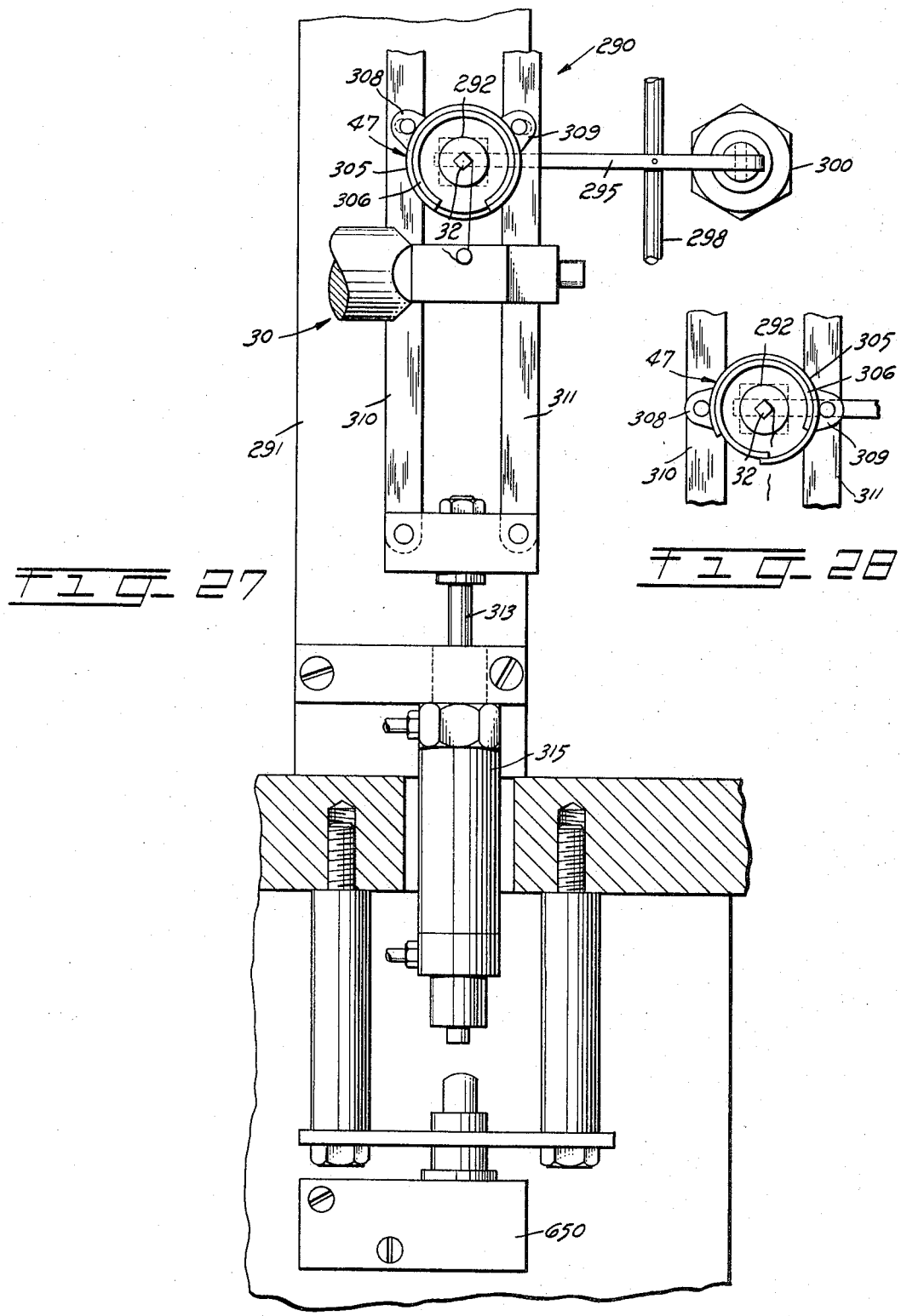

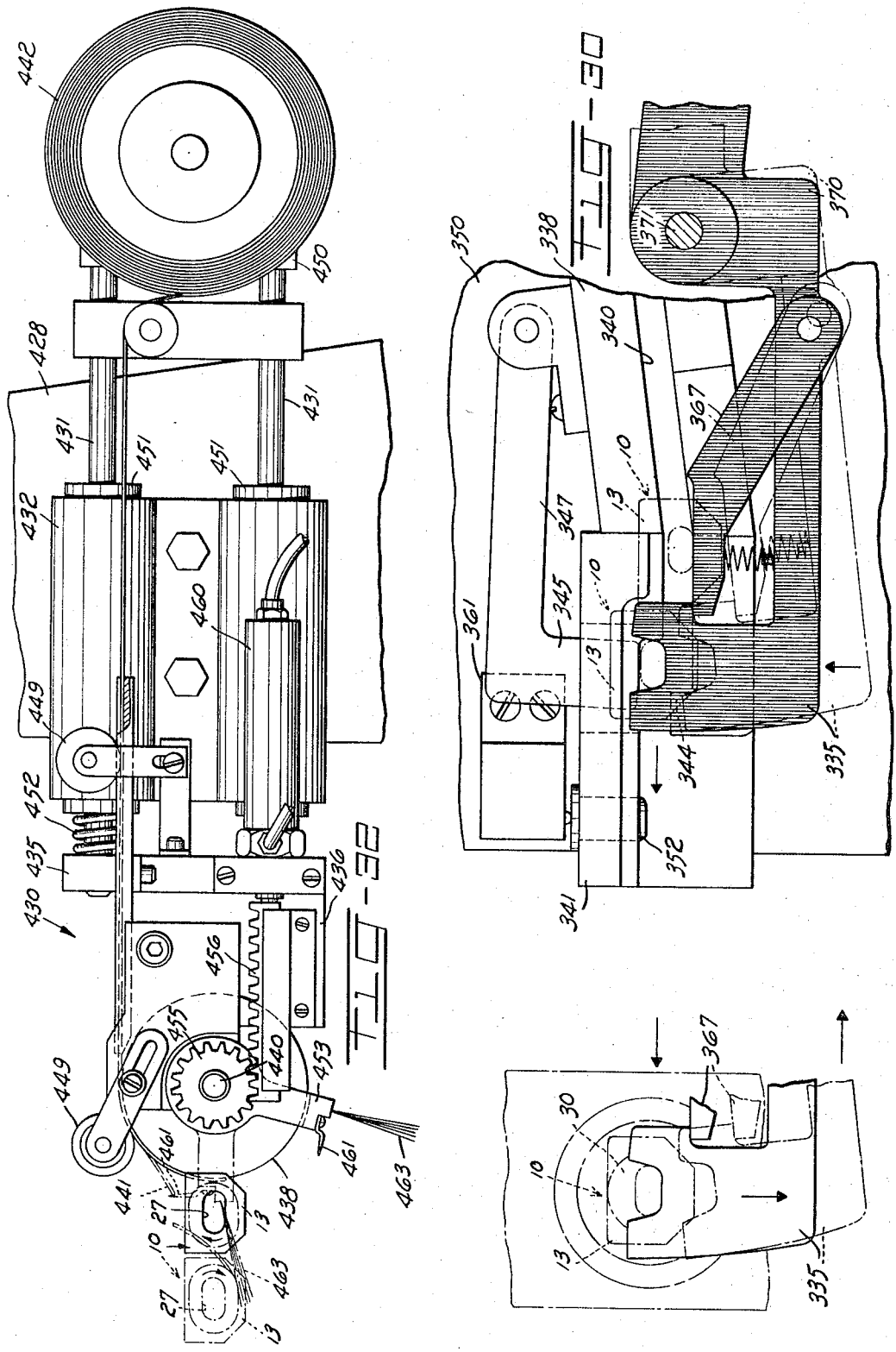

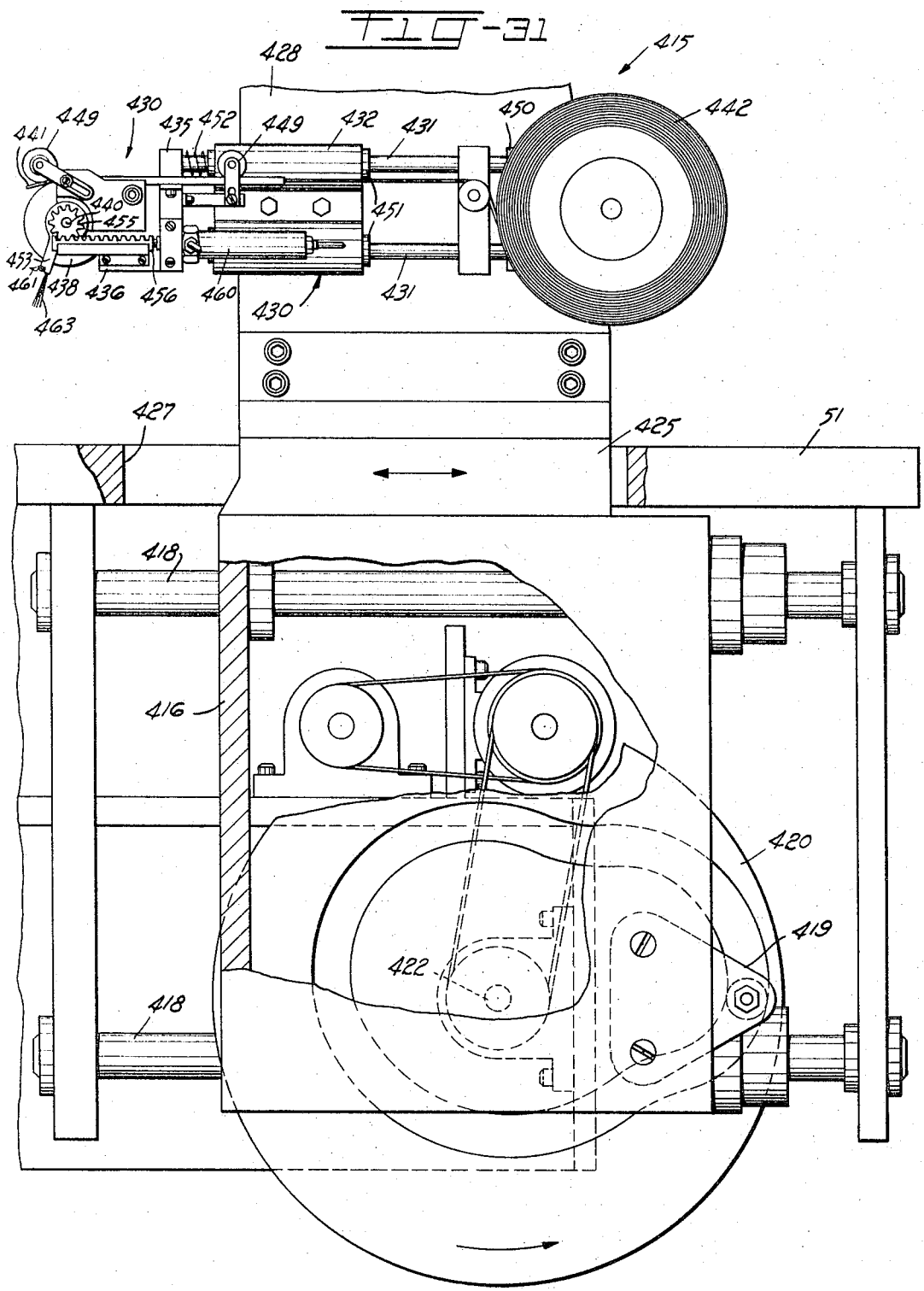

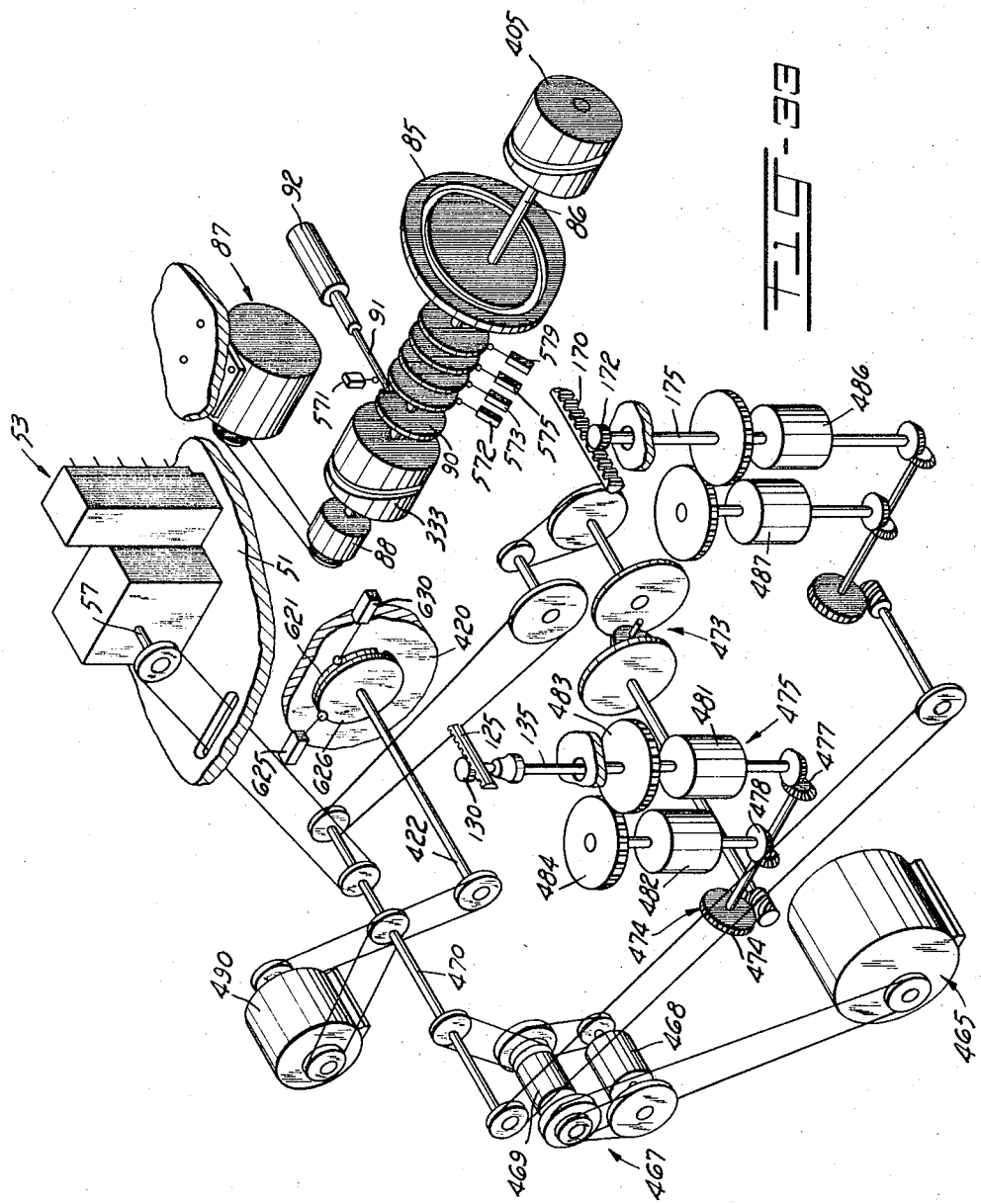

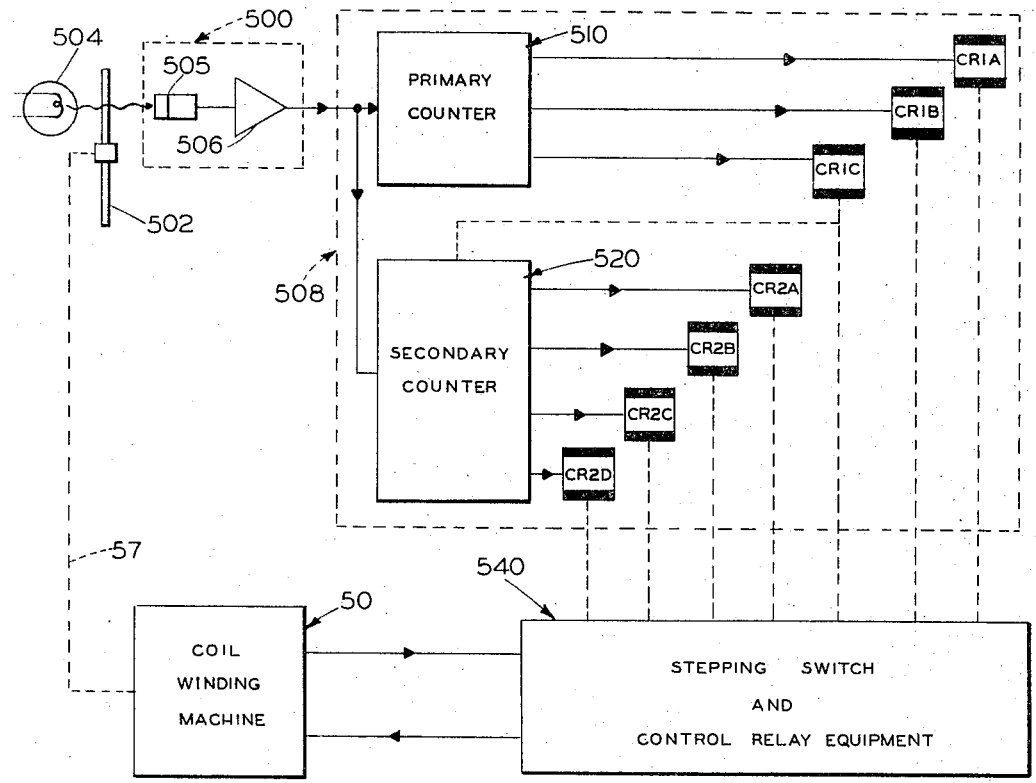

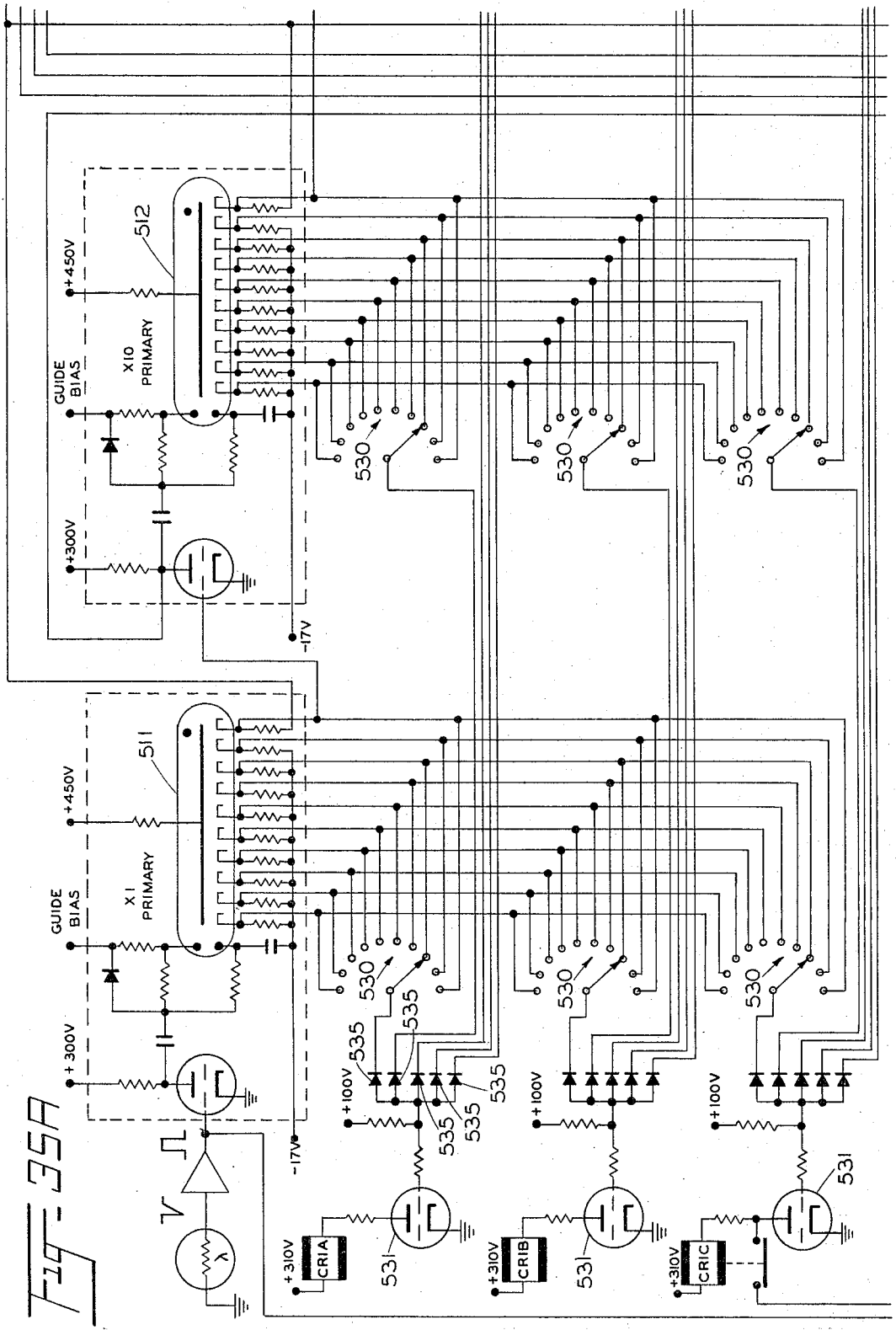

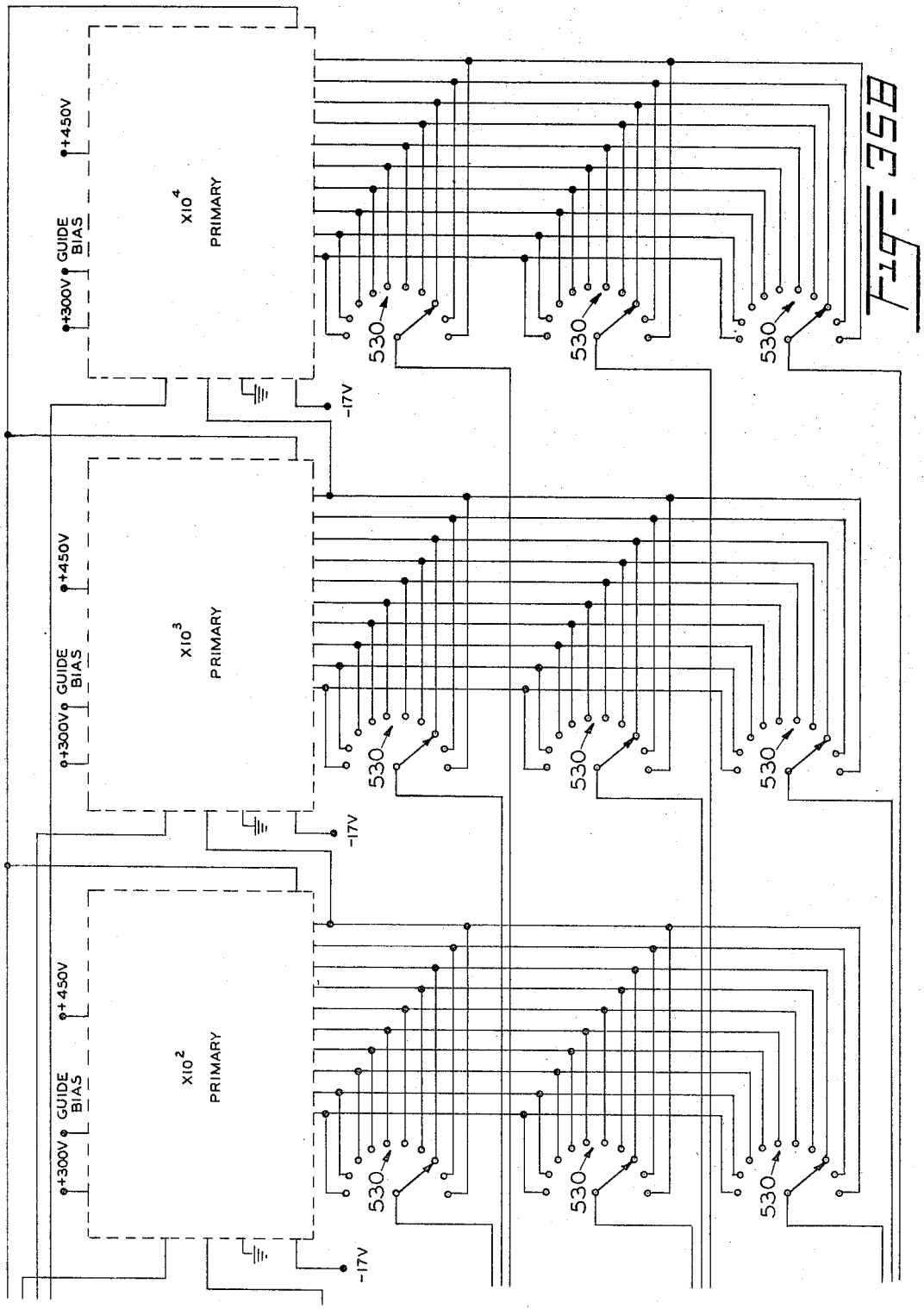

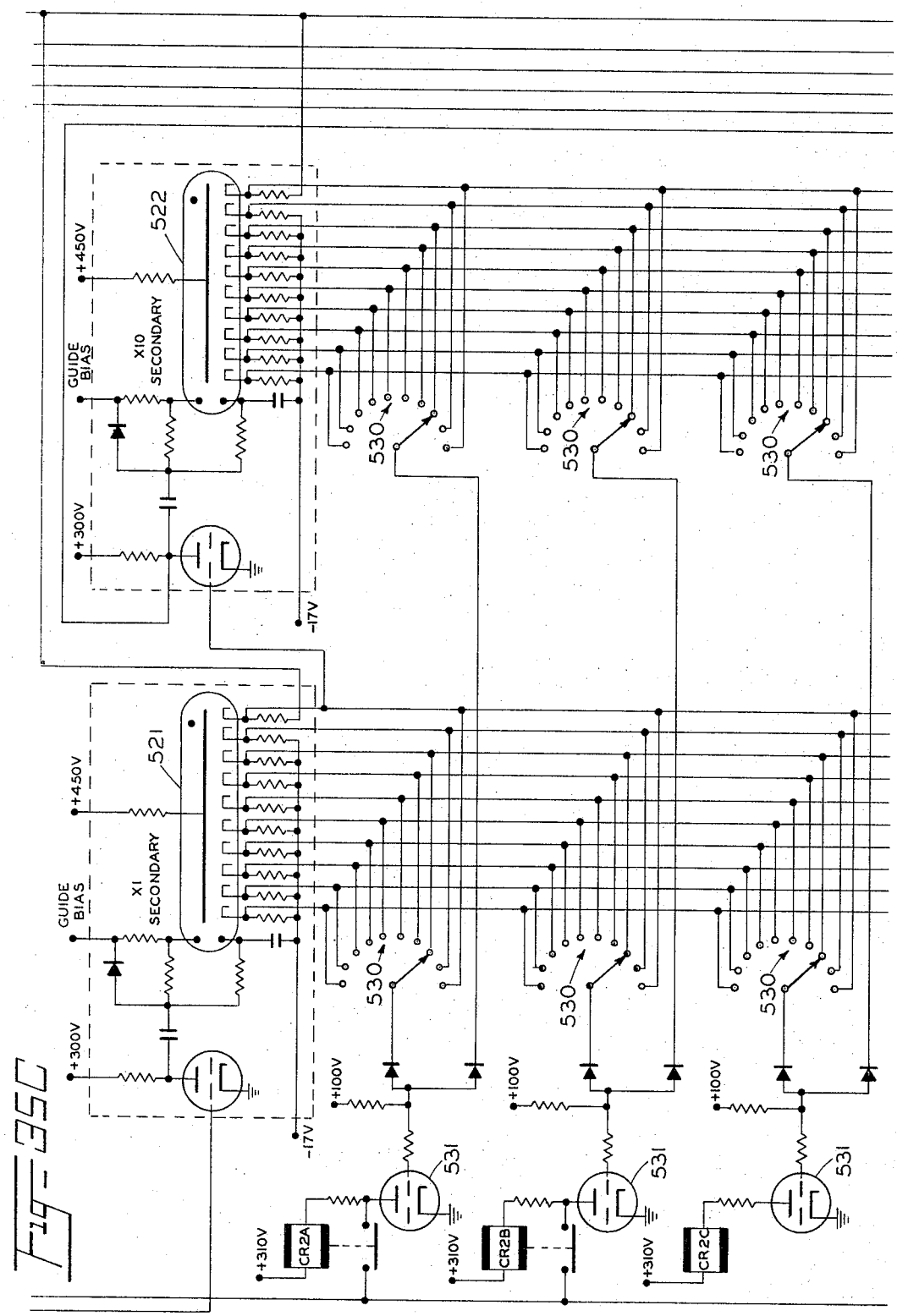

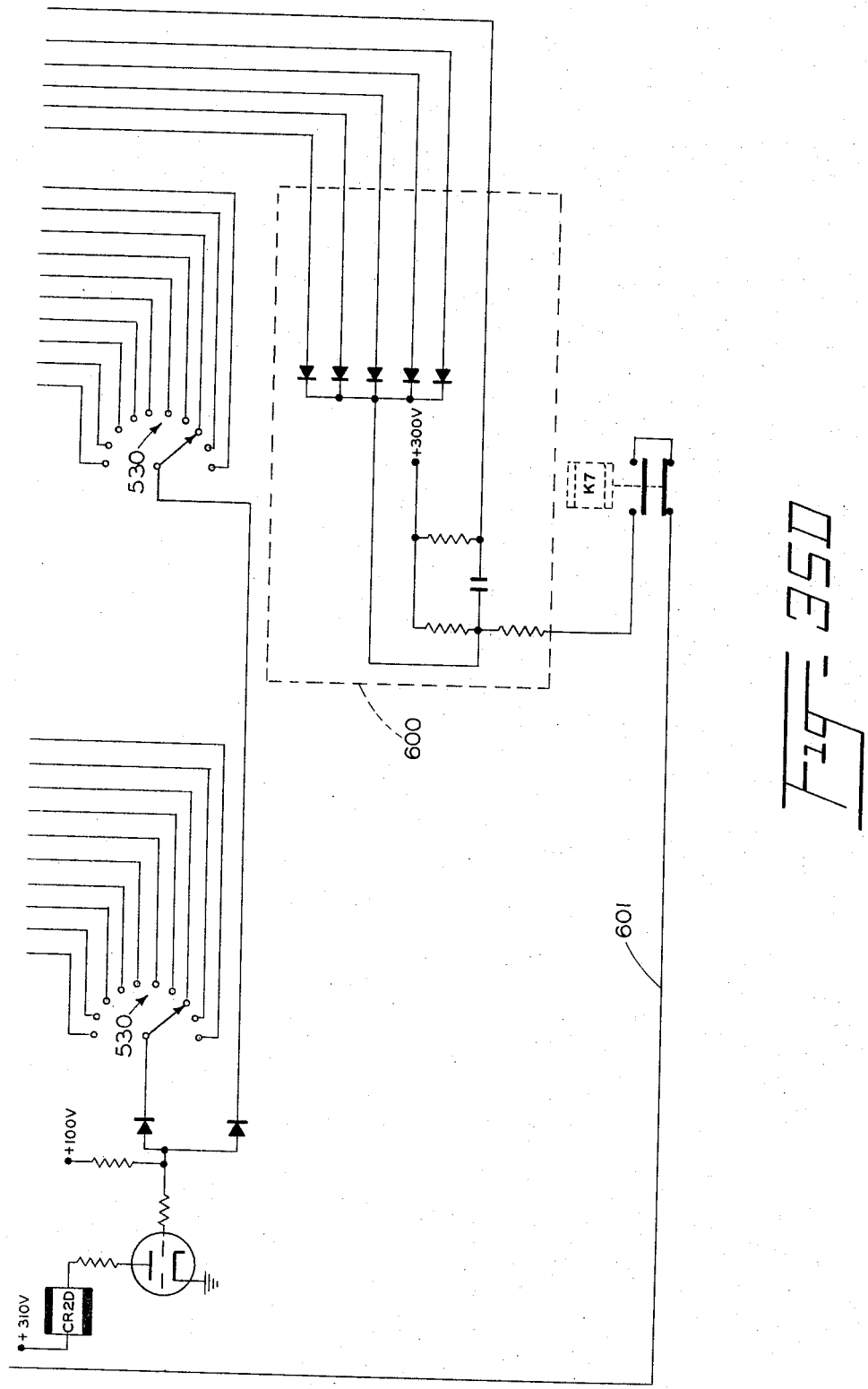

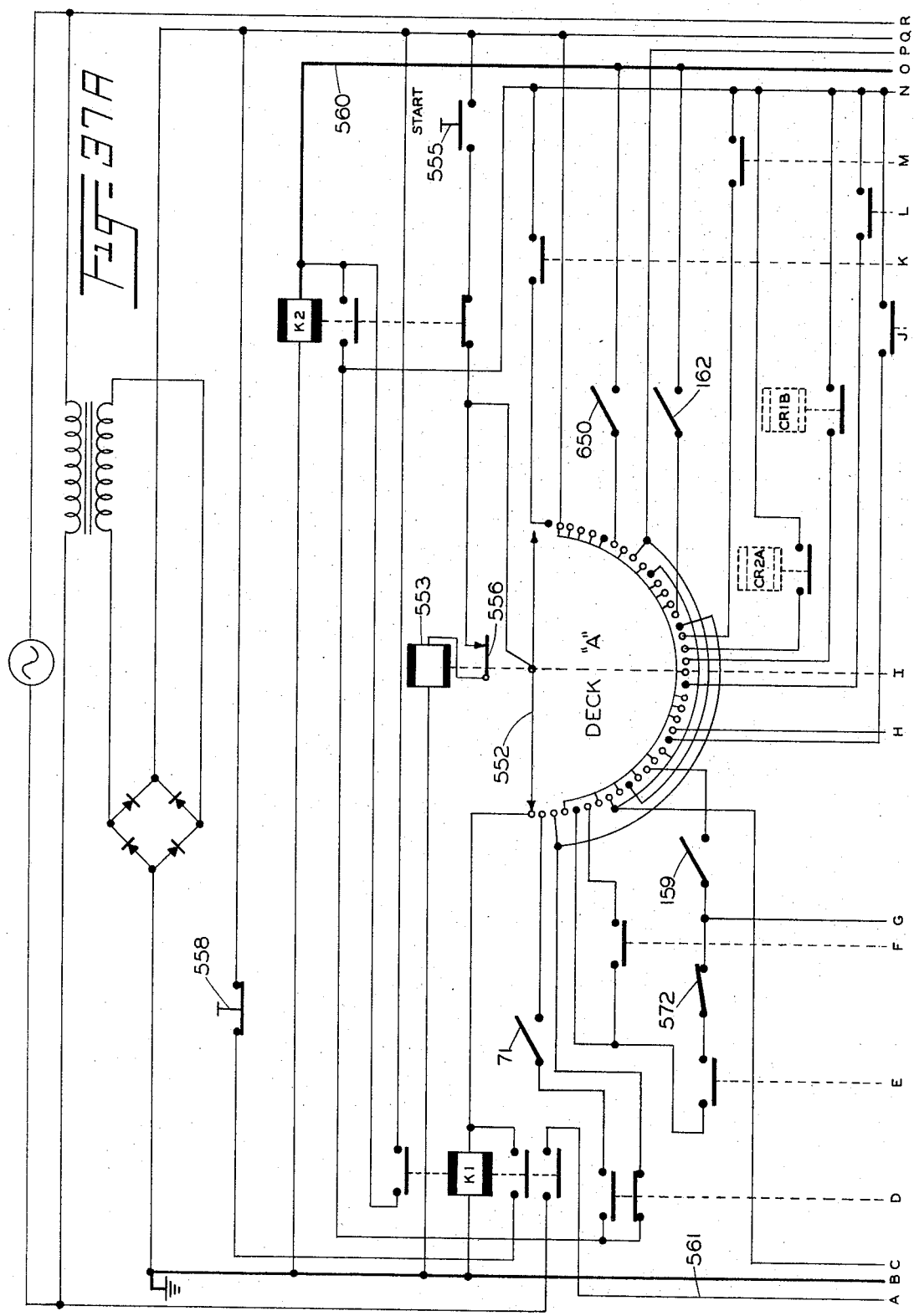

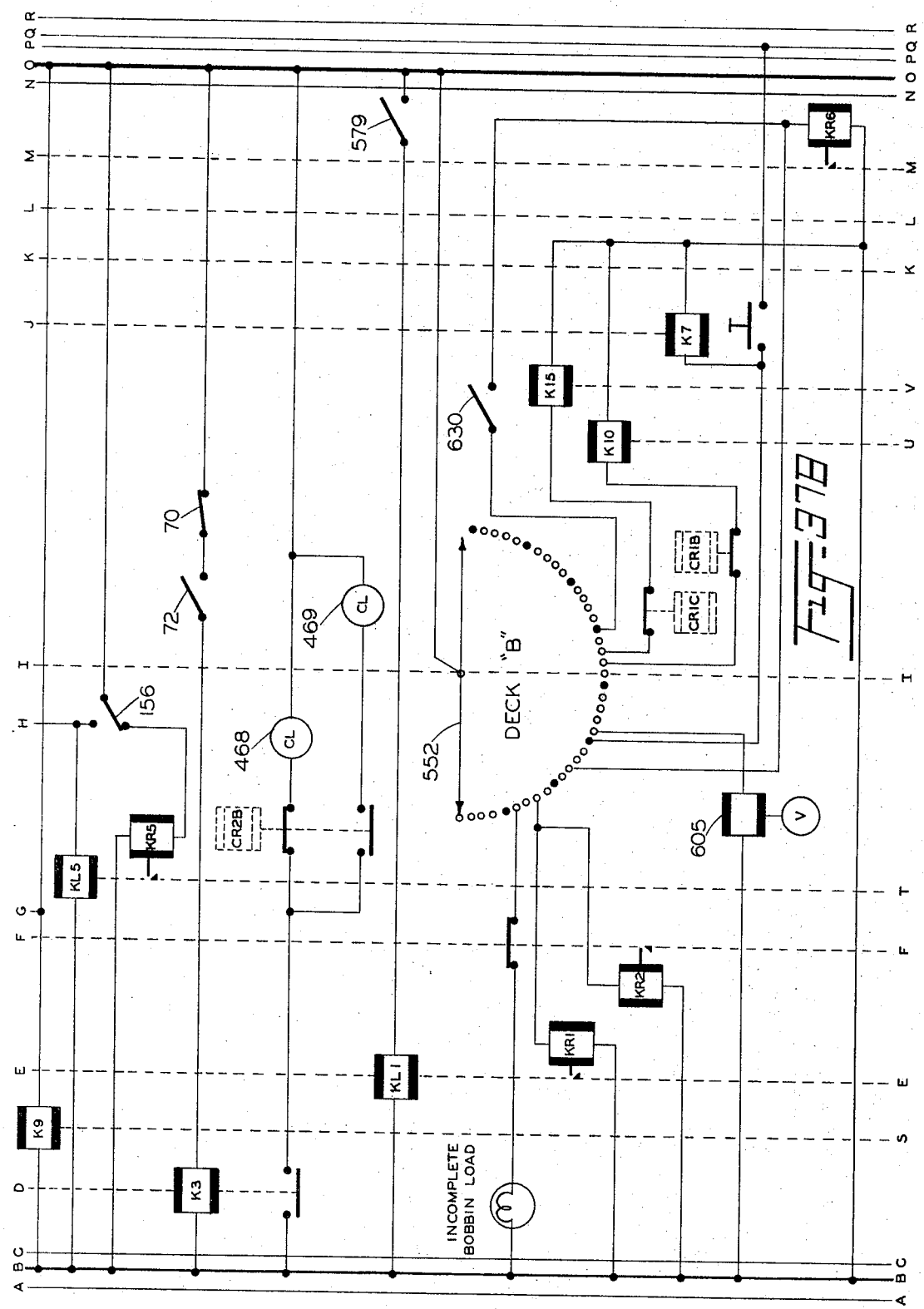

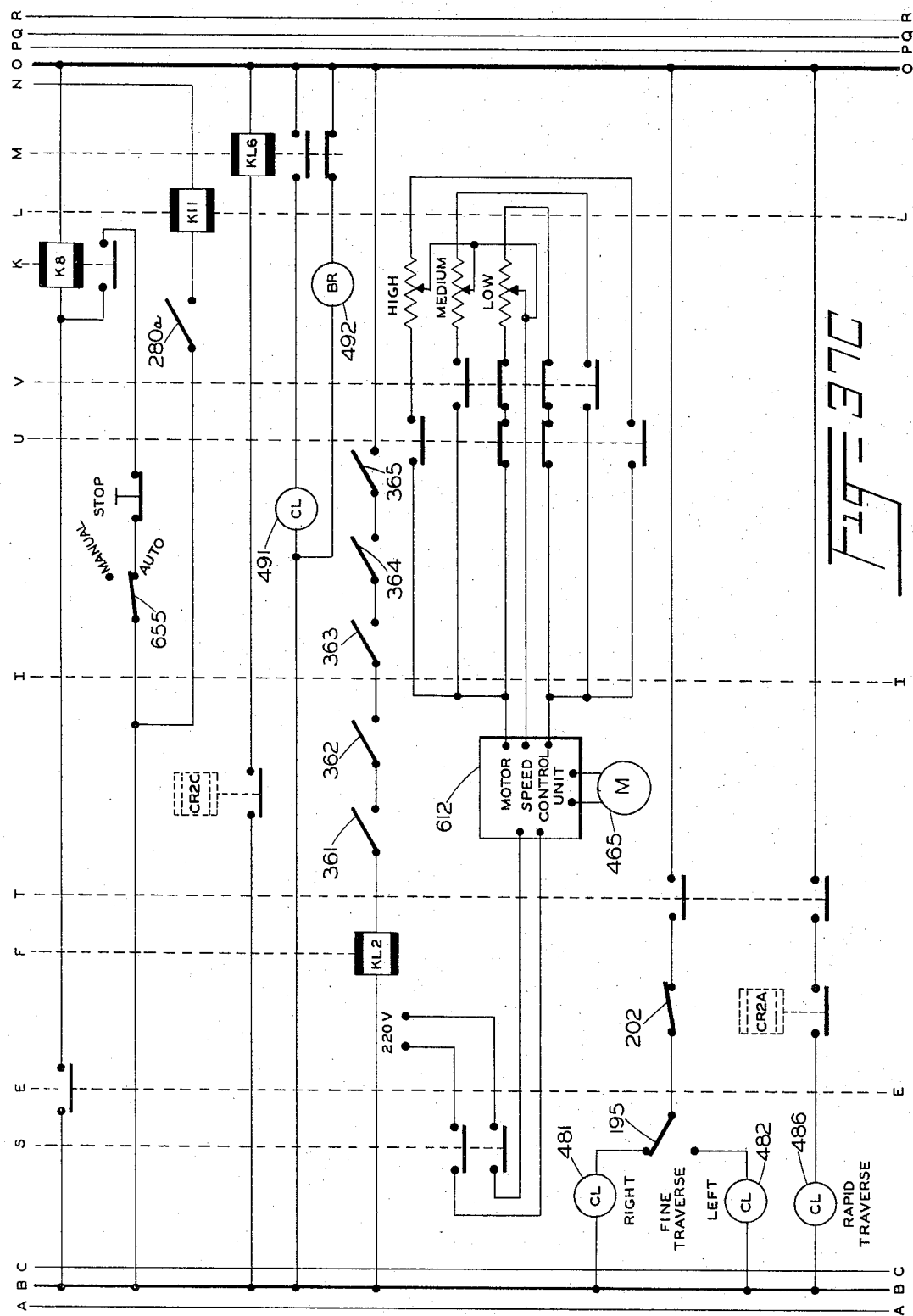

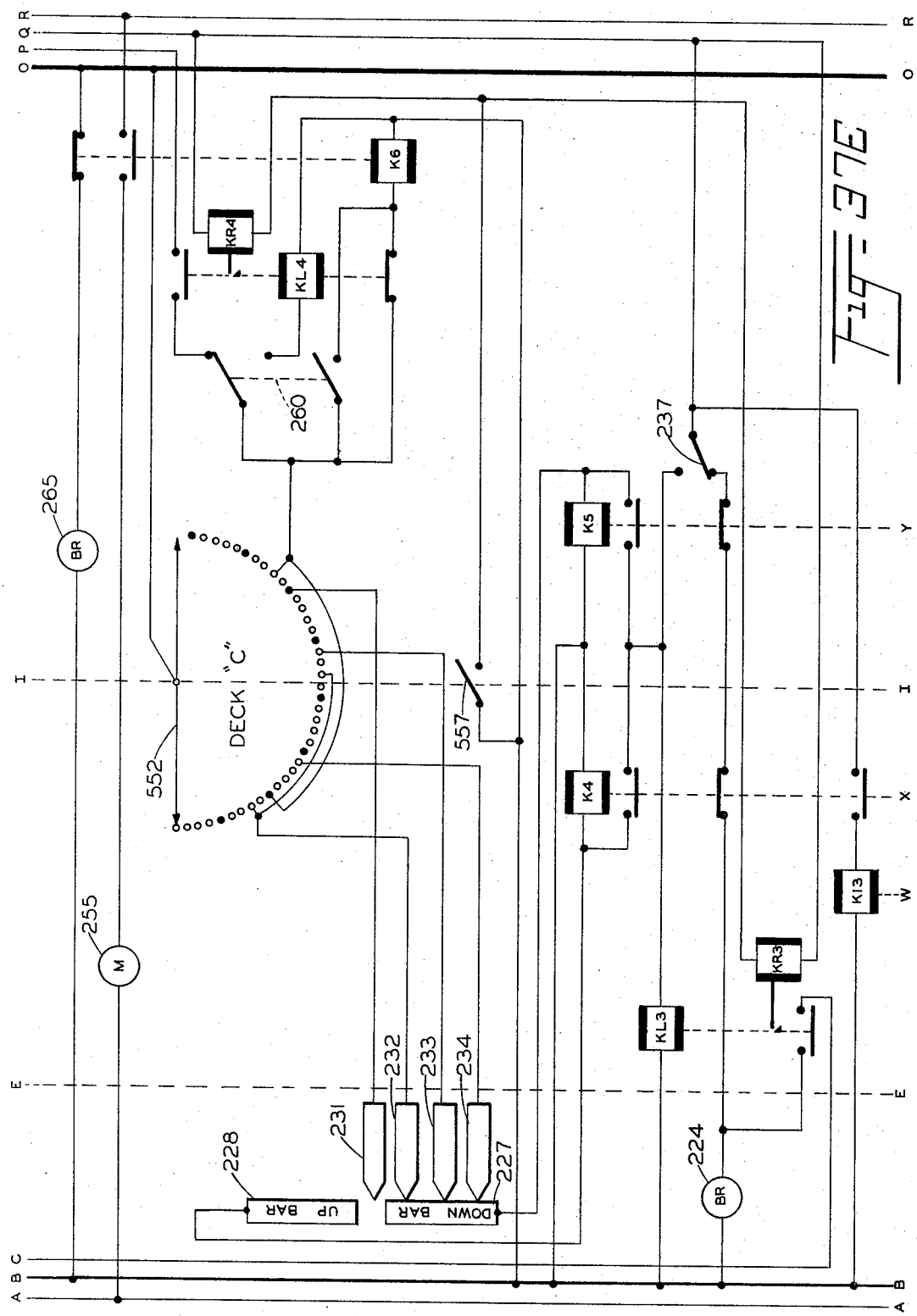

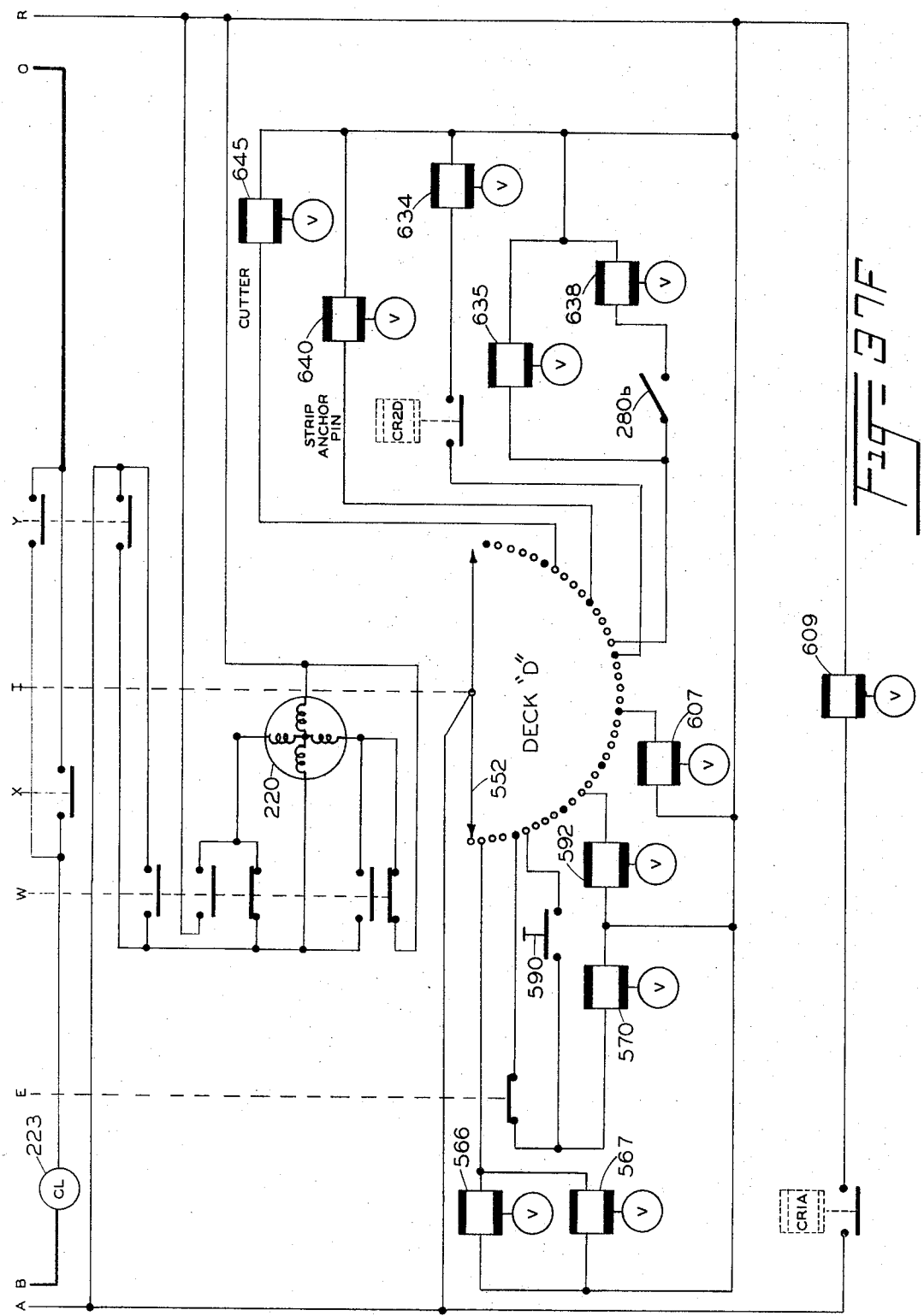

This invention relates to methods of and apparatus for winding wire and, more particularly, to methods of and apparatus for winding electrical coils for relays and the like.

Electrical coils are basic components of electrical communications equipment and millions of coils are manufactured annually. Manifestly, substantial savings can result from improvements in methods of and apparatus for producing electrical coils.

In the manufacture of electrical coils it is conventional to employ molded plastic bobbins having a central winding portion or drum provided with flanges at the ends. A predetermined number of turns of relatively fine gauge wire are placed upon the drum in closely packed, substantially uniform layers of convolutions to form an electrical coil having predetermined electrical characteristics. The bobbin may be provided with metal terminal elements suitably secured to one or both of the flanges. Relatively long lead-in and lead-out portions of the winding are usually provided. The lead-in and lead-out portions are wrapped about corresponding terminal elements and soldered to establish the electrical terminations for the coil.

Conventional apparatus for winding coils of this type have winding cycles which are not fully automatic. For example, when a wound bobbin is removed from a winding arbor and replaced by an empty bobbin, it is necessary to regain control over the leading end of the wire by manually attaching the same to the arbor or the replacement bobbin so that upon subsequent rotation of the arbor the wire would be taken up on the new bobbin.

It is an object of this inention to provide new and improved methods of and apparatus for winding strand material.

It is another object of this invention to provide new and improved methods of and apparatus for winding electrical coils automatically.

Still another object of this invention is to provide new and improved methods of and apparatus for winding a coil on a bobbin at high speeds, forming lead-in and lead-out portions, ejecting the wound bobbin, replacing the same with an empty bobbin and reinitiating the winding cycle without interruption.

The foregoing and other objects may be accomplished, in accordance with a method embodying the invention by interrupting the winding of a wire on a spool when a coil of a desired size has been wound and moving a wire guide relative to the spool to form a span of the wire extending from the wound coil. The end of the span of wire adjacent to the wire guide is then attached to a relatively fixed point and then the span of wire between the fixed point and the spool is broken to form a predetermined length of lead-out wire extending from the coil. The new leading end of the wire supply extending from the wire guide remains attached to the fixed point. Control of the wire supply is, thus, maintained so that the winding of a subsequent coil may be commenced without the intervention of an operator.

Apparatus illustrating certain features of the invention may, in accordance with one embodiment of the invention, involve an improvement in apparatus for winding coils on spools wherein a rotatable arbor is provided for supporting the spool and the wire is directed through a movable wire guide and pulled onto the rotating spool while relative to-and-fro movement of the wire guide distributes convolutions of the wire across the winding surface of the spool. The improvement may include an anchor pin positioned adjacent to the arbor and the spool and means operated, after a predetermined number of convolutions have been placed on the spool, for stopping the rotation of the arbor and the to-and-fro movement of the wire guide. Means are provided for moving the wire guide subsequently relative to the anchor pin to position one immediately adjacent to the other. Means are provided for revolving the wire guide relative to the arbor to wrap the end of a span of the wire extending from the wound coil about the anchor pin. The span may then be severed by suitable means to form a lead extending from the wound coil, while the leading end of the wire extending through the wire guide remains attached to the anchor pin.

A complete description of the invention may be had from the following detailed description of methods and apparatus forming exemplary embodiments thereof when read in the light of the accompanying drawings, in which:

FIG. 1 is an enlarged, perspective view of a bobbin of an exemplary type which may be employed in practicing the invention to form wound electrical coils having predetermined electrical characteristics;

FIGS. 2–10, inclusive, illustrative pictorially various steps in an exemplary coil winding operation performed in accordance with the invention;

FIG. 11 is an enlarged, perspective view of an arbor pin;

FIG. 12 is a perspective view of an automatic coil winding machine embodying the invention, with parts thereof omitted or broken away for the sake of clarity;

FIG. 13 is an enlarged, front elevational view, partially broken away, of the coil winding machine shown in FIG. 12;

FIG. 14 is an enlarged, side elevational view of the coil winding machine with parts broken away;

FIG. 16 is a side elevational view of the spindle head assembly shown in FIG. 15, with parts broken away;

FIG. 17 is a horizontal section taken along lines 17—17 of FIG. 15, with parts broken away;

FIG. 18 is an enlarged, front elevational view of a tail stock assembly forming part of the coil winding machine shown in FIG. 12, with parts broken away;

FIG. 19 is an enlarged, vertical section, taken along lines 19—19 of FIG. 14, illustrating a locking cam and an air-operated detent assembly;

FIG. 20 is an enlarged view, partially broken away, of a portion of a wire guide assembly forming part of the coil winding machine as viewed in FIG. 13;

FIG. 22 is an enlarged view of still another portion of the wire guide assembly forming part of the coil winding machine as viewed in FIG. 13, with parts broken away for the sake of clarity;

FIG. 23 is an enlarged, vertical section taken along lines 23—23 of FIG. 21;

FIG. 24 is an enlarged, fragmentary view, partially broken away, of a vertical position sensor associated with the wire guide assembly;

FIG. 25 is an enlarged, fragmentary, vertical section taken along lines 25—25 of FIG. 22;

FIG. 26 is an enlarged, side elevational view, partially broken away, of a radial carriage and attached wire guide tubes forming part of the wire guide assembly;

FIG. 27 is an enlarged, fragmentary, front elevational view of an anchor pin and cutter assembly;

FIG. 28 is a fragmentary view of a cutter mechanism forming part of the anchor pin and cutter assembly shown in FIG. 27, the cutter mechanism being illustrated in its operating condition;

FIG. 29 is an enlarged, fragmentary, perspective view of the cutter mechanism and associated operating elements;

FIG. 30 is an enlarged, fragmentary, side elevational view of a portion of a bobbin loading assembly for feeding bobbins to arbors of the coil winding machine;

FIG. 31 is an enlarged, fragmentary, vertical section illustrating in detail portions of a taping assembly forming a part of the coil winding machine and arranged for applying lengths of pressure-sensitive tape to wound electrical coils;

FIG. 32 is an enlarged, side elevational view of a taping unit forming part of the taping assembly illustrated in FIG. 31;

FIG. 33 is a schematic diagram of a drive system and related electromechanical controls for the coil winding machine;

FIG. 34 is a block diagram of an electrical control system for controlling the operation of the coil winding machine;

Figure 9:
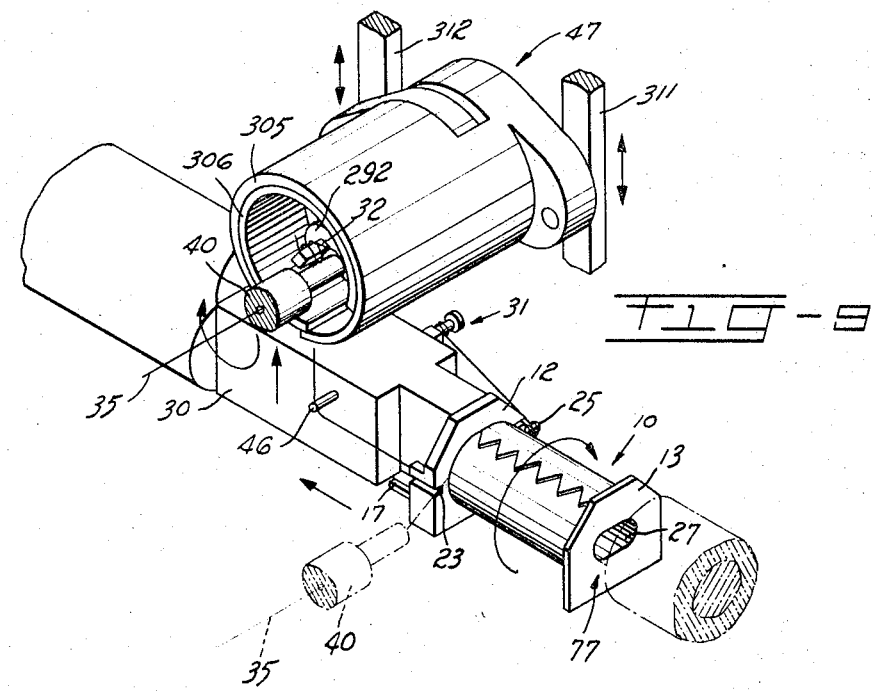

FIGS. 35A–35D, inclusive, together, constitute a simplified schematic diagram of an electronic counter unit forming part of the electrical control system;

FIG. 36 is a diagram showing the manner in which FIGS. 35A–35D, inclusive, are arranged;

FIGS. 37A–37F, inclusive, together, constitute a simplified schematic diagram of a stepping switch and relay control unit forming another part of the electrical control system; and FIG. 38 is a diagram showing the manner in which FIGS. 37A–37F, inclusive, are arranged.

GENERAL DESCRIPTION OF COIL WINDING OPERATION

Referring now to FIG. 1, there is shown a molded plastic spool or bobbin 10 which is designed to serve as a winding form and support for an electrical coil, for example, the armature coil of a relay. The bobbin 10 includes a drum 11 on which insulated wire is to be wound in substantially uniform layers of helical convolutions between left and right flanges 12 and 13, respectively. The outer face of the left flange 12 is provided with two, integrally molded plastic bosses 14 and 15 in which are secured metal terminals 16 and 17, respectively. The spaced longitudinal axes of the terminals 16 and 17 are generally parallel to one another and to the longitudinal axis of the bobbin 10. To facilitate the positioning and attaching of the lead-in portion of the insulated wire onto the bobbin 10 at the beginning of a winding operation, the left flange 12 is provided with a slot 20 which is open at the peripheral edge of the flange and at its inner face, the opening extending from the outer periphery of the flange to the winding surface of the drum 11. The bosses 14 and 15 are provided with lead-in and lead-out grooves 22 and 23, respectively, formed in their outer peripheries and extending substantially parallel to the respective terminals 16 and 17. The lead-in groove 22 communicates with the slot 20 and is provided to facilitate the final positioning of a lead-in portion of the insulated wire. The lead-out groove 23 extends across the peripheral edge of the flange 12 to the inner face thereof and is employed to position a lead-out portion of the wire extending from the last convolution formed in a coil winding placed on the drum 11.

A projecting lug 25 is molded integrally with the flange 12 and the boss 14 and projects laterally outwardly from the boss at a point immediately above and to one side of the opening of the slot 20 in the peripheral edge of the flange. As will become more apparent from the following description, the projecting lug 25 functions as a camming member and guide to facilitate the insertion of the lead-in portion of the insulated wire into the slot 20 at the beginning of a winding operation. An edge of the projecting lug 25, around which the lead-in portion of the insulated wire is passed, is preferably rounded. As best shown in FIG. 1, the bobbin 10 is hollow and has an axial, non-circular bore 27 extending therethrough from the outer face of the left flange 12 to the outer face of the right flange 13.

FIGS. 2–10, inclusive, illustrate schematically a series of steps in the winding of an electrical coil in accordance with one embodiment of the invention. As illustrated in FIG. 3, a bobbin 10 is removably mounted on a rotatably driven arbor 30. The arbor 30 is provided with a radially projecting arbor pin 31 which, at the start of a coil winding cycle, is positioned directly below an anchor pin 32 at a fixed location. At this time, the axes of the arbor pin 31 and anchor pin 32 are horizontal, substantially parallel and lie in a common vertical plane.

A supply of insulated wire 35, for example, fine copper wire having a thin, impervious coating of an insulating enamel, is arranged to be fed through a hollow, needle-like guide tube 40. At the termination of an immediately preceding coil winding cycle, a portion of the wire 35 was wrapped in a plurality of turns tightly about the anchor pin 32 so that the leading end of the wire which is subsequently to be pulled through the wire guide tube 40 during a new coil winding cycle, is anchored securely to the anchor pin, as shown in FIG. 2. The anchor pin 32 has a generally rectangular cross section to insure proper anchorage of the tightly wrapped turns of the wire 35. As the new winding cycle commences, the wire guide tube 40 is moved vertically downwardly to a position immediately adjacent to the arbor pin 31. As the wire guide tube 40 moves, the wire 35 is pulled and drawn therethrough from a wire supply spool 41. As shown best in FIG. 3, the longitudinal axis of the wire guide tube 40 is parallel to the axis of the anchor pin 32 and, in moving downwardly to a position immediately adjacent to the arbor pin 31, moves in a vertical plane, hereinafter referred to as the "anchor pin plane," which is spaced slightly to the right of the aforementioned vertical plane including the axes of the arbor pin 31 and the anchor pin 32.

When the wire guide tube 40 is positioned immediately adjacent to the arbor pin 31 and in the same horizontal plane (arbor pin level), it is caused to make two complete revolutions about the axis of the arbor pin 31 to form two turns of the wire 35 about the latter (FIG. 3). The wire guide tube 40 is next caused to index horizontally to the right, as viewed in FIG. 4, at the arbor pin level, toward the flange 12 of the bobbin 10. This indexing movement of the wire guide 35 to the right carries a span of wire from the arbor pin 31 across the top surface of the projecting lug 25 on the bobbin 10. The rightward indexing movement is accurately controlled and is stopped with the axis of the wire guide tube 40 positioned slightly above and substantially in precise alignment with the slot 20 in the left flange 12 of the bobbin 10. Next, the wire guide tube 40 is caused to move downwardly below the longitudinal axis of the bobbin 10 to approximately a horizontal plane (slot lead-in level) substantially below the lowermost winding surface of the drum 11. The arbor 30 is then rotated slowly in the direction shown by the arrow in FIG. 5, causing the wire 35 to be cammed into the slot 20 in the left flange 12 by the projecting lug 25, the wire being guided into position on the winding surface of the drum 11 and against the inside face of the flange 12.

As the arbor 30 begins to rotate, the span of wire 35 extending between the arbor pin 31 and the anchor pin 32, breaks because of the tension placed on the relatively fragile wire. However, because of the rectangular cross-sectional configuration of a root portion 44 (FIG. 11) of the arbor pin 31 about which the wire 35 was wrapped tightly, the wire remains connected to the arbor pin 31. Thus, a lead-in portion of a coil which is subsequently to be wound about the drum 11, is formed.

The low-speed rotation of the arbor 30 and bobbin 10 continues until three or four closely packed, uniform, helical turns of wire are placed evenly on the drum 11 of the bobbin 10, as shown in FIG. 6. As these latter turns are placed on the drum 11 of the bobbin 10, the wire guide tube 40 is traversed horizontally to the right at a speed synchronized with the speed of the rotating bobbin 10 to achieve uniform, closely packed turns. The wire guide tube 40 is then retracted a short distance in a horizontal direction outwardly from the winding surface of the drum 11 and then moved vertically upwardly from the slot lead-in level to a horizontal winding plane coincident with the arbor pin level, as shown in solid outlines in FIG. 6. Concurrently, the arbor 30 and bobbin 10 are accelerated to a relatively high winding speed, e.g., 10,000 r.p.m. The traverse movement of the wire guide tube 40 continues in synchronism with the speed of the rotating bobbin 10 to continue the winding of uniform, closely packed, helical turns of wire on the drum 11. The traverse motion of the wire guide tube 40 is alternately reversed as the wire guide tube reaches the extremities of the drum 11 adjacent to the inside surfaces of the left and right flanges 12 and 13, respectively, so that as the winding proceeds a plurality of uniformly wound, superimposed layers are formed, as shown in FIG. 7.

The high-speed winding operation continues until a major portion of the desired number of turns (e.g., 6800 turns) of wire have been wound upon the drum 11 of the bobbin 10. When a point is reached in the operation where only a predetermined number of turns (e.g., 200 turns) still remain to be wound, the rotational speed of the arbor 30 drops to a medium speed, for example, approximately 2000 r.p.m. When the point is reached where only a second predetermined number of turns (e.g., 30 turns) remain to be wound, the traverse movement of the wire guide tube 40 is controlled to insure that, as the last few turns of the remaining thirty turns are placed on the drum 11, the wire guide tube is positioned immediately adjacent to the inside of the left flange 12. During this time, the wire guide tube 40 moves vertically downwardly, as shown in phantom outline in FIG. 7, to a horizontal plane (lead-out level) containing the longitudinal axis of the lead-out groove 23 in preparation for the pulling of a lead-out portion of the winding and the rotation of the spindle is slowed down to a low speed. When the wire guide tube 40 reaches the position immediately adjacent to the inside of the left flange 12, it is temporarily locked in that position and a taping mechanism 45 is operated to apply a strip of pressure-sensitive insulating tape over the outer layer of turns on the drum 11, as best shown in FIG. 8, as the bobbin continues to rotate at low speed. During the taping operation, one or more turns of the remaining predetermined number of turns of wire are applied and upon completion of the predetermined number of turns of wire, rotation of the bobbin is stopped and the arbor 30 is temporarily locked, as shown in FIG. 9, with the bobbin 10 oriented 180° from the starting position shown in FIG. 3, so that the lead-out groove 23 and the wire guide tube 40 are in the same horizontal plane.

The wire guide tube 40 is driven a radially short distance in toward the bobbin 10 and horizontally to the left to the anchor pin plane, passing under a radially projecting guide pin 46 on the arbor 30, and is thereafter moved upwardly in the anchor pin plane until it is immediately adjacent to the anchor pin 32. The wire guide tube 40 is then revolved about the axis of the anchor pin 32 to wrap the wire tightly thereabout preparatory to the next winding cycle. The span of wire extending between the guide pin 46 and the anchor pin 32 is then several by a cutter mechanism 47 (FIG. 9) surrounding the anchor pin to form the lead-out portion of the electrical coil.

During the high-speed winding of the coil, for example, at 10,000 r.p.m. centrifugal forces exerted on the turns of wire initially stored on the root portion 44 of the arbor pin 31 are sufficient to cause these turns to be thrown outwardly onto a reduced, cylindrical, intermediate portion 48 (FIG. 11). However, these turns are prevented from being thrown completely off the arbor pin 31 by an enlarged knob 49 that is provided on the arbor pin 31 to prevent this occurrence.

Figure 10:
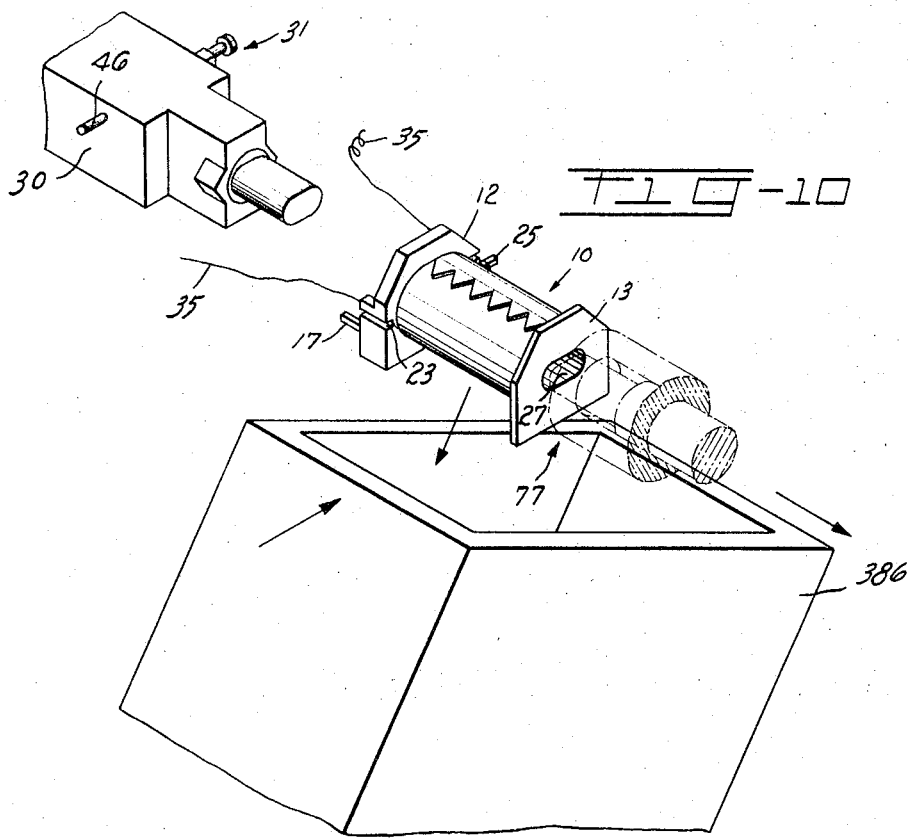

As shown in FIG. 10, the completed coil is now pulled axially to the right and disengaged from the arbor 30 to permit the insertion of another empty bobbin 10 preparatory to a subsequent coil winding cycle. As the completed coil is pulled to the right from the arbor 30, the wrapped turns of the wire now encircling the cylindrical, intermediate portion 48 of the arbor pin 31 are easily disengaged without placing the undue stresses on the lead-out and lead-in portions of the coil.

AUTOMATIC COIL WINDING MACHINE

Shown in FIG. 12 is a coil winding machine 50 which represents an exemplary embodiment of the invention. This machine is designed to wind five bobbins 10—10 simultaneously; however, it should be readily apparent that, while five bobbin-winding stations are shown, the number could be greater or less depending upon the rate of production desired.

SPINDLE HEAD ASSEMBLY

Figure 15:
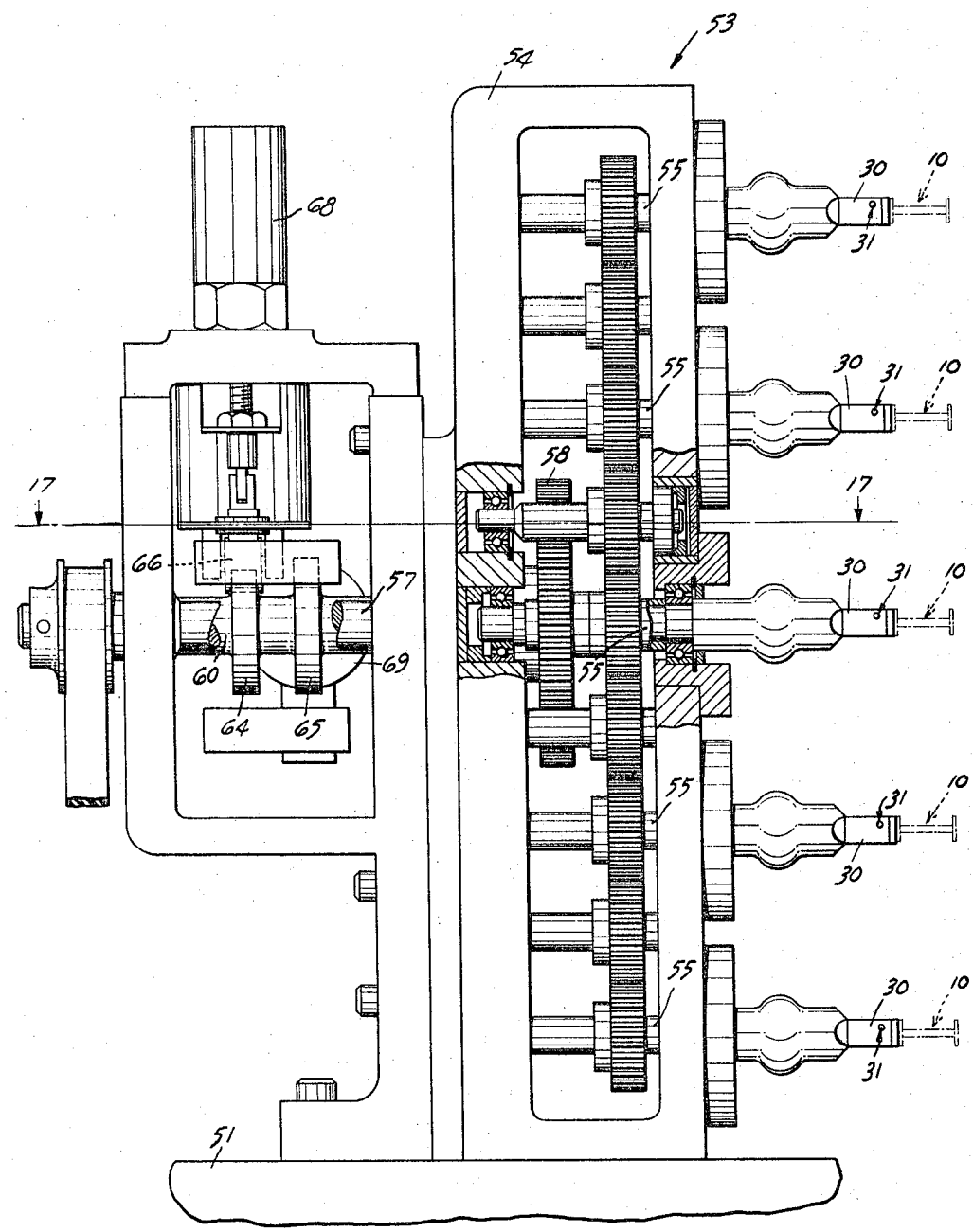
FIG. 15 is an enlarged, vertical section, partially broken away, of a spindle head assembly forming part of the coil winding machine.

As shown in FIG. 12, the automatic coil winding machine 50 includes a horizontal base plate 51 supported by a suitable pedestal structure. Mounted fixedly on the base plate 51 is a spindle head assembly, indicated generally by the numeral 53, comprising a housing 54 which is designed to support five rotatable spindles 55—55 mounted in a parallel, vertically spaced arrangement (FIG. 15). The spindles 55—55 are operatively connected to one another and to a common spindle drive shaft 57 through a gear train, including a spur gear 58, which is designed to rotate all five of the spindles simultaneously in the same direction and at the same speed (clockwise as viewed in FIG. 16).

Mounted in the housing 54 in spaced parallel relationship with respect to the spindle drive shaft 57 is a spindle positioning shaft 60 (FIG. 17) which is geared directly to the spindle drive shaft for rotation therewith through the spur gear 58 and a meshing spur gear 62 keyed to the spindle positioning shaft. Notched spindle positioning cams 64 and 65 are mounted on the spindle positioning shaft 60 for rotation therewith. The spindle positioning cams 64 and 65 are arranged for cooperation with a top spindle detent 66 (FIG. 15) and a side spindle detent 67 (FIG. 17), respectively, to stop selectively the rotation of the spindle drive shaft 57 and, thus, the spindles 55—55 in either of two predetermined angular positions spaced 180° apart. Except during the winding portion of the machine cycle, one or the other of the detents 66 and 67 is operative and held in engagement with its respective spindle positioning cam. Double-acting air cylinders 68 and 69 operate the detents 66 and 67, respectively.

When top spindle detent 66 is engaged in the notch of cam 64, the lead-in groove 22 is presented to the wire guide tube 40, as shown in FIG. 3. Correspondingly, when the side spindle detent 67 is engaged in the notch of cam 65, the lead-out groove 23 faces the wire guide tube 40, as shown in FIG. 9. Microswitches 70 and 71 (FIG. 16) cooperate with the top spindle detent 66 for sensing its engaged and fully retracted positions, respectively. Similarly, a microswitch 72 is provided for sensing the engaged position of the side spindle detent 67.

Secured to each of the spindles 55—55 is an arbor 30 having an axially projecting, stepped end having a configuration complementary to that of the left-hand end of a bobbin 10 which is to be engaged thereon in driving relationship. As best shown in FIG. 10, a protruding nose on the end of each arbor 30 is designed to fit closely, but loosely, within the axial bore 27 of the bobbin 10. It may be seen that with a bobbin 10 positioned in the manner just described, a driving engagement is established. Each of the arbors 30—30 is provided on one surface with an arbor pin 31, the function of which has been described previously. On the opposite surface a guide pin 46 is provided, the function of which has also been mentioned previously.

TAIL STOCK ASSEMBLY

Cooperatively associated and axially aligned with a corresponding one of each of the arbors 30—30 is a normally free-wheeling live center 77. The five live centers 77—77 are carried by a movable tail stock assembly, indicated generally by the numeral 80 in FIGS. 12 and 18. The tail stock assembly 80 is mounted slidably for horizontal reciprocation on parallel, horizontal guide rods 81—81 mounted beneath the base plate 51. Reciprocating movement is imparted to the tail stock assembly 80 through a linkage 82 operated by a crank 83 driven by a cam 85 (FIG. 13). The cam 85 is mounted on a camshaft 86 which is driven by a drive motor 87 through an electrically operated friction clutch 88 (FIG. 33). Also mounted on the camshaft 86 is a notched locking cam 90 which cooperates with a detent 91 which is operated by an air cylinder 92 (FIG. 19).

The movable tail stock assembly 80 (FIG. 18) includes vertical support members 93 and 94 which extend through elongated slots 95 and 96, respectively, formed in the base plate 51. As best shown in FIG. 18, the live centers 77—77 are supported in a vertically spaced array on the support member 93. Each of the live centers 77—77 includes a mandrel 98 having a reduced end portion of a cross-sectional configuration complementary to that of the bore 27 in a bobbin 10. The reduced tip portion of the mandrel 98 is designed to be thrust into a closely fitting, frictional engagement within the bore 27.

The mandrel 98 is slidably received within a bore and counterbore extending axially through a stripper member 101 rotatably mounted on roller bearings within a shouldered sleeve 104. The stripper member 101 is free to rotate with respect to the shouldered sleeve 104, but relative axial movement between the stripper member and shouldered sleeve is precluded. The sleeve 104 with the assembled stripper member 101 and mandrel 98 is mounted within a bushing secured within an opening provided in the vertical support member 93. A compression spring 109 surrounding a reduced portion of the sleeve 104 urges the sleeve and connected stripper member 101 to the extreme left-hand position in which it is shown in FIG. 18. In this position the teeth of a spur gear 110, which is keyed on the right-hand end of the stripper member 101, engage the teeth on a stationary rack element 111 which is, in turn, secured to the vertical support member 93. With the teeth so engaged, the stripper member 101 and mandrel 98 are locked against rotation.

As shown in FIG. 18, the right-hand end of the mandrel is operatively connected to a stripper plate 112 by means of a ball bearing journal assembly which permits free rotation of the mandrel 98 about its longitudinal axis relative to the stripper plate, while fixing the mandrel to the stripper plate for movement therewith in the direction of the longitudinal axis of the mandrel. Thus, it may be seen that reciprocation of the stripper plate 112, which is mounted slidably on parallel guide rods 115—115 extending between the two vertical support members 93 and 94, results in the alternate extension and retraction of the mandrels 98—98 with respect to their respective stripper members 101. This feature permits the stripping of a bobbin from a live center 77 after the completion of a winding cycle. As shown in FIG. 18, compression springs 116—116 normally urge the stripper plate 112 to the left. Movement of the stripper plate 112 to the right against the action springs 116—116 is accomplished by means of an air cylinder 117 which is fixed to the stripper plate and has its piston rod connected to the vertical support member 93.

WIRE GUIDE ASSEMBLY

A wire guide assembly, indicated generally by the numeral 120 in FIG. 12, is mounted adjacent to the spindle head assembly 53. The wire guide assembly 120, which is supported from a support plate 122 extending vertically upwardly from the base plate, controls the positioning of wire guide tubes 40—40.

Wire guide assembly—Horizontal movement

Attached to the support plate 122 (FIGS. 13 and 22) is a horizontal guide rod 124 which is arranged in spaced parallel relationship with respect to a fine traverse drive rod 125 which functions as a guide rod in addition to its main function as a fine traverse drive. To permit horizontal reciprocating motion of the fine traverse drive rod 125, the latter is suitably journaled. A cutout 129 formed in the support plate 122 provides clearance for a spur gear 130 which meshes with the teeth of a rack section 132 formed on the left-hand end of the fine traverse drive rod 125 (as viewed in FIG. 20). The spur gear 130 is mounted on the upper end of a fine traverse drive shaft 135 which extends vertically through an opening provided in the base plate 51.

A carriage driver 138 is pinned to the drive rod 125 for movement in unison therewith. As best shown in FIG. 20, the driver 138 has a generally inverted T-shaped configuration and comprises an elongated shank depending from the drive rod 125 and an enlarged, generally rectangularly shaped head formed integrally at the lower end of the shank. The driver 138 is designed to drive a horizontal traverse carriage 145, hereinafter referred to as the horizontal carriage 145, which is a plate-like member, journaled slidably on both the guide rod 124 and drive rod 125. A depending projection 147 on the carriage 145 is connected to the left-hand end (as viewed in FIG. 20) of a piston rod 148 of a double-acting air cylinder 150 which is mounted on and secured to the shank of the driver 138. The movable piston rod 148 extends from the cylinder 150 through an aperture formed in the shank of the driver 138. The purpose of the air cylinder 150 is to achieve precise, incremental, horizontal indexing of the wire guide tubes 40—40 for accurate positioning between the anchor pin plane and a vertical plane aligned with slots 20—20 in the bobbins 10—10 mounted on their respective arbors 30—30.

Facilities are provided for locking the fine traverse drive rod 125 in a predetermined horizontal position. As illustrated in FIG. 23, these facilities include a notched locking cam 152 secured on the fine traverse drive shaft 135, which cooperates with a detent 153 operated by a double-acting air cylinder 155. A microswitch 156 is provided to detect the detent position. When the detent 153 is engaged with the locking cam 152, the drive shaft 135 is locked to accurately position the wire guide tubes 40—40.

Mounted on the shank of the driver 138 (FIG. 20) is an adjustable striker 157. The striker 157 is aligned axially with a spring-biased actuator 158 of a switch 159 mounted on the front of the carriage 145. When the piston rod 148 is in its fully retracted position, the striker 157 is in pressing engagement with the actuator 158 and the microswitch 159 is closed. Another striker 160 is mounted to the support plate 122 for cooperation with a spring biased actuator 161 of a microswitch 162 and when the piston rod 148 is fully extended the microswitch 162 is held closed.

Figure 21:
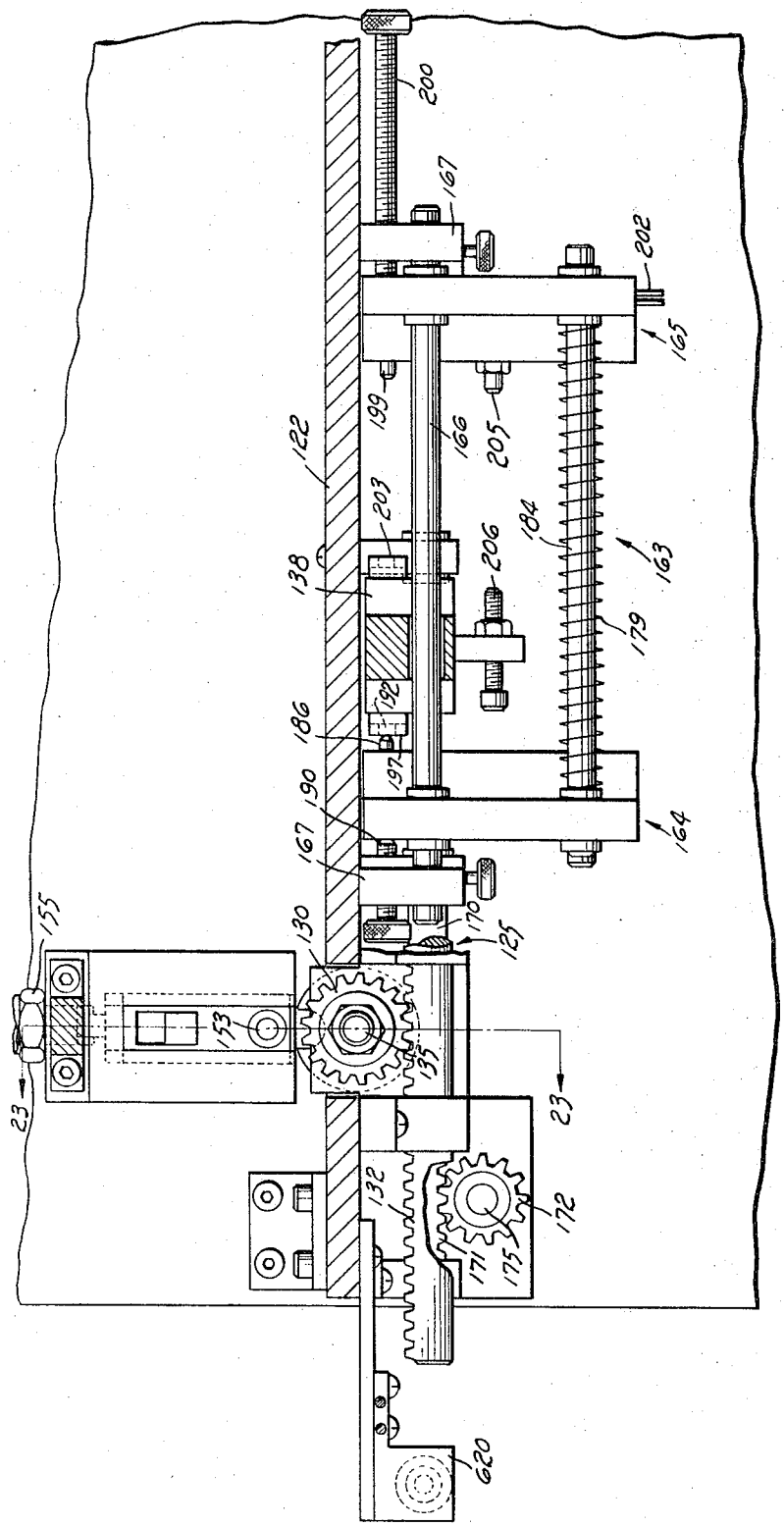
FIG. 21 is a horizontal section taken along lines 21—21 of FIG. 20.
Figure 370:
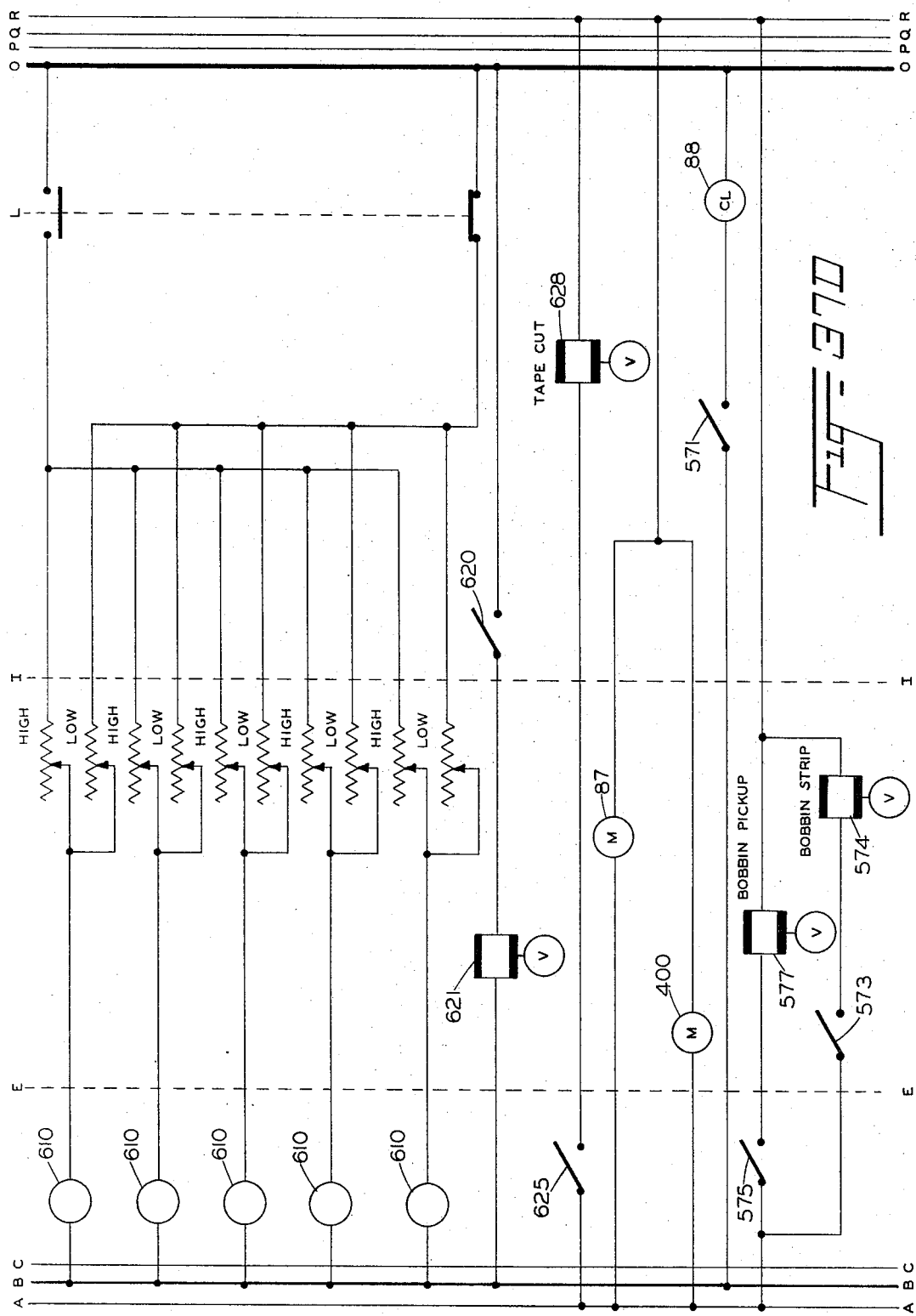

A rapid traverse mechanism 163 (FIGS. 20 and 21) is mounted to the support plate 122 beneath the horizontal carriage 145 for cooperation with the driver 138. The rapid traverse mechanism 163 includes a pair of movable, rapid traverse carriages 164 and 165 which are essentially mirror images of one another. The rapid traverse carriages 164 and 165 are mounted slidably on a horizontal guide rod 166 supported at its opposite ends by spaced bracket members 167—167 fixed to the vertical support plate 122. The rapid traverse carriages 164 and 165 are also slidably mounted on a rapid traverse drive rod 170. The left-hand end of the drive rod 170 is provided with a toothed rack section 171 which meshes with a rapid spur gear 172 mounted on the upper end of a rapid traverse drive shaft 175 which extends vertically through an opening provided in the base plate 51. It may be seen that rotation of the drive shaft 175 is converted into horizontal movement of the drive rod 170.

A collar fixed to the drive rod 170 is designed to cooperate with the left-hand face of the carriage 164 during rightward movement of the drive rod to transport the carriage 164 to the right. Similarly, another collar fixed to the drive rod 170 cooperates with the right-hand face of the carriage 165 during leftward movement of the drive rod. The carriages 164 and 165 are normally urged apart by compression springs 179—179 mounted on stabilizing rods 184 and 184. The stabilizing rod 184 is fixed to the carriage 164 and slidably received in the carriage 165. Conversely, the stabilizing rod 185 is fixed to the carriage 165 and slidably received in the other.

As shown in FIG. 20, the carriage 164 is provided with a slidable, spring-biased plunger 186 mounted in a counter-bored seat 187. The compression springs 179—179 normally urge the carriage 164 to the left and against the end of a limit adjustment stop 190 threadedly received within the bracket member 167. The stop 190 is adjustably positioned axially to establish the limits of the leftward travel of the carriage 164, as will become more apparent from the following description.

It may be seen from FIG. 20 that, when the carriage 164 is in abutting contact with the end of the stop 190, the right-hand end of spring-biased plunger 186 protrudes axially from the right-hand face of the carriage 164 and in this position is capable of striking the left-hand end of a horizontally shiftable actuator 192 which operates a SPDT two-way reversing switch 195 (FIG. 37C) mounted within the head of the driver 138. When the plunger 186 strikes the actuator 192, the reversing switch 195 is thrown to reverse the direction of travel of the driver 138, as will become more apparent as the specification proceeds. It will also be seen that, when the carriage 164 is moved rightwardly so that the plunger 186 is no longer in engagement with the limit adjustment stop 190, the plunger is fully retracted within its counter-bored seat 187 and cannot engage the actuator 192 and that, instead, the right-hand face of the carriage 164 upon relative movement toward the driver 138 will strike the end face of a sleeve-like metal housing 197 which projects from the head of the driver 138 and surrounds and extends beyond the end of the actuator 192. Thus, with the plunger 186 retracted, the carriage 164 may push against the driver 138 without operating the reversing switch 195. It will be understood, however, that if the plunger 186 is extended the actuator 192 will be struck and the reversing switch 195 will be thrown before the right-hand face of the carriage 164 can contact the end of the housing 197.

Similarly, the carriage 165 is provided with a plunger 199 identical in construction and operation to the plunger 186. A limit adjustment stop 200 is provided on the bracket member 167 for accurately adjusting and setting the rightward limits of travel of the driver 138 through an analogous cooperation between the plunger 199 and the opposite end of the spring-biased actuator 192. A housing 203 surrounds the opposite end of the actuator 192 and is similar in construction and purpose to the housing 197.

The carriage 165 also carries a microswitch 202 which has a spring-biased actuator 205 projecting leftward from the left-hand face of the carriage. The actuator 205 is aligned for cooperation with an adjustable striker 206 supported in a projecting ear attached to the driver 138. The microswitch 202 is normally closed and when the actuator 205 is contacted, it is opened to disengage the fine traverse drive shaft 135 from its drive, in a manner hereinafter to be described.

*Wire guide assembly—Vertical movement*

A vertical positioning carriage 215 (FIG. 22), hereinafter referred to as the vertical carriage 215, is mounted slidably on the front face of the horizontal carriage 145 between spaced, parallel vertical ball-bearing guides 216—216 forming a vertical slideway. Vertical movement of the vertical carriage 215 is controlled by a vertical drive motor 220 (FIG. 13) mounted on the horizontal carriage 145. As best shown in FIG. 22, the motor 220 has an integral gear reduction unit and right angle output shaft operatively connected through a clutch and brake unit 221 and a right angle transmission to a vertically extending lead screw 222. The clutch and brake unit 221 includes an electrically operated friction clutch 223 and an electrically operated brake 224 (FIG. 37). A ball nut 226 is mounted on the lead screw 222 and is arranged to move axially along the lead screw in a direction dependent upon the direction of rotation of the lead screw. The ball nut 226 is fixed to the vertical carriage 215 so that the latter travels vertically with the ball nut. Thus, it may be seen that through appropriate control of the motor 220 the vertical position of the carriage 215 may be varied within the limits of its travel.

A vertical position sensor 225 (FIGS. 22 and 24) is provided for electrically sensing and controlling the vertical positioning of the carriage 215. The sensor includes a movable member 226 of insulating material which supports two electrically conductive position sensing bars, a DOWN bar 227 and an UP bar 228 (FIG. 24). The sensing bars 227 and 228 are mounted in vertically aligned, coplanar, insulated relationship and are separated vertically from one another by a gap of a predetermined distance. The member 226 is mounted on the top of the vertical carriage 215 for cooperation with a stationary member 229 of insulating material which supports a vertically spaced array of spring-loaded electrical contact fingers 231, 232, 233 and 234 (FIG. 24). The sensing bars 227 and 228 are arranged for sliding engagement with the spring-pressed contact fingers.

Each of the contact fingers 231 to 234, inclusive, is associated with a corresponding vertical position of the vertical carriage 215. The top contact finger 231 corresponds to the vertical position of the carriage 215 in which the wire guide tubes 40—40 are at the levels of their respective anchor pins 32—32 (anchor pin level). The next one down, i.e., contact finger 232, corresponds to the position in which the wire guide tubes 40—40 are at the levels of their respective arbor pins 31—31 (arbor pin level). The next lower contact finger 233 corresponds to the position in which the wire guide tubes 40—40 are located in the horizontal planes of the respective lead-out grooves 23—23 (lead-out level). The lowest contact finger 234 corresponds to the position at which the wire guide tubes 40—40 are located in planes substantially below the lowermost winding surfaces of the drums 11—11 of their respective bobbins 10—10 (slot lead-in level).

The operation of the vertical position sensor 225 is cooperatively interconnected with the operation of a notched, fine position cam 235 which is driven rotatably by the motor 220. The previously described gap between the position sensing bars 227 and 228 merely establishes the coarse positioning level of the vertical carriage 215. It is the fine position cam 235 which functions to precisely establish the fine positioning level of the vertical carriage 215. The fine position cam 235 rotates in synchronism with the lead screw 222 and makes one complete 360° cycle for each rotation of the lead screw. During each cycle, an actuator 236 of a microswitch 237 which rides on the cam 235 momentarily drops into a notch formed in the cam. However, until the coarse positioning level is reached, the microswitch 237 is incapable of exercising any control over the stop of the vertical carriage 215. But, once the coarse vertical positioning level has been reached, i.e., when the then active contact finger enters the gap between the position sensing bars 227 and 228, the next time the actuator 236 of the microswitch 237 drops into the notch on the cam 235, circuits under the control of the microswitch are energized to stop the vertical carriage 215 precisely at the desired fine positioning level. It is to be understood that the length of the gap is made slightly greater than the vertical distance traveled by the vertical carriage 215 during one complete revolution of the lead screw. As will be explained more fully hereinafter in connection with the description of an electrical control system, the cam-operated microswitch 237 and the vertical position sensor 235 cooperate to achieve precisely desired vertical positions of the carriage 215.

Wire guide assembly—Wrapping motion

Superimposed on the vertical carriage 215 is a wrapping carriage 240 (FIG. 22) which is capable of revolving movement relative to the former. The wrapping carriage 240 is in the form of a flat, plate-like member provided with a pair of vertically aligned, circular apertures, one of which designated by the numeral 241 is shown in FIG. 25. Mounted in each of the apertures 241—241 is a ball bearing 242, one of which is shown in detail in FIG. 25. Projecting through rectangular cutouts 245—245 formed in the wrapping carriage 240 are spaced legs 246—246 of mounts 248—248, one of which is shown in FIG. 25. The legs 246—246 of each of the mounts are secured fixedly to the vertical carriage 215. It is to be noted that the rectangular cutouts 245—245 are deliberately made oversized to allow for movement of the wrapping carriage relative to the vertical carriage 215.

Movement is imparted to the wrapping carriage 240 through rotatably driven stub shafts 250—250, each having a circular disc-like, eccentric cam portion, one of which designated by the numeral 251 is shown in detail in FIG. 25. Referring to FIG. 25, it may be seen that the eccentric cam portion 251 is received closely with the complementary opening in the inner race of the ball bearing 242 mounted in its associated aperture 241. One end of the stub shaft 250 is journaled in the vertical carriage 215 and the other end of the stub shaft extends through the mount 248, wherein it is journaled and is provided with a toothed, timing belt pulley 253 keyed thereto.

An electric motor 255, hereinafter referred to as the wrapping motor 255, is mounted to the vertical carriage 215 through an enlarged, oversized opening formed in the wrapping carriage 240 and has an integral gear reduction unit and right angle output shaft which is connected to drive a toothed pulley 257. The pulley 257, in turn, meshes with a toothed timing belt 258 which runs around the pulleys 253—253. When the timing belt 258 is driven by the motor 255, the stub shafts 250—250 are simultaneously driven to rotate their identical, eccentric cam portions 251—251, which, in turn, by virtue of their eccentricity cause the wrapping carriage to revolve in a fixed attitude.

For each revolution of the wrapping motor output shaft, the stub shafts 250—250 make two complete revolutions. A microswitch 260 is secured to the housing of the wrapping motor 255 and has an actuator which rides against the camming surface of a notched control cam 262 driven rotatably by the wrapping motor output shaft. The microswitch 260 is arranged to control the energization of the wrapping motor 255 and an electrically operated friction brake 265 in such a manner that upon energization of the motor, the motor continues to operate until the output shaft turns through 360°, at which point the control cam operates the microswitch 260 to deenergize the motor and to energize the brake to immediately stop the wrapping motor output shaft.

Wire guide assembly—Radial movement

As best shown in FIG. 22, the right-hand end of the wrapping carriage 240 projects horizontally a short distance beyond the vertical carriage 215 and the horizontal carriage 145, and carries a support plate 270 which is positioned in a vertical plane perpendicular to the support plate 122. Attached to the support plate 270 are horizontally extending, parallel spaced ball-bearing guides 271—271 forming a horizontal, transversely extending slideway in which a radial carriage 275 is mounted slidably. The radial carriage 275 (FIG. 26) is in the form of a flat, plate-like member from which a large, rectangular, central section has been removed to provide clearance. Attached to the radial carriage 275 is a vertically extending mounting frame 282 which carries the five vertically spaced wire guide tubes 40—40. The wire guide tubes 40—40 are each provided with a needle-nosed end portion having a restricted passageway through which a wire 35 is advanced from one of five individual wire supply spools 41—41 (FIG. 14).

In-and-out movement of the radial carriage 275 is accomplished by means of a double-acting air cylinder 278 which is secured to the support plate 270. A piston rod of the air cylinder 278 is attached to the radial carriage 275. The limits of travel of the radial carriage 275 are controlled by a sensitive, two-way switch 280 having contacts 280a and 280b, which is mounted on the support plate 270. The switch 280 has an actuator which extends from opposite sides thereof for cooperation with shouldered plungers 283 and 284 (FIG. 26) mounted slidably in a yoke 285 encompassing the switch. Threadedly adjustable striker members 287 and 288 are carried by the radial carriage 275 and are arranged to hit the plungers 283 and 284, respectively, at opposite extremes of the in-and-out movement of the radial carriage. When one of the plungers 283 or 284 is struck, it moves to strike a corresponding end of the actuator to throw the switch 280 in one direction or the other depending on which end is struck, thereby closing one of the contacts 280a or 280b and opening the other. The switch 280 then remains in this condition until the other end is struck. By appropriately adjusting the striker members, the limits of travel of the radial carriage may be accurately set. In addition, the switch senses whether the radial carriage is in or out.

ANCHOR PIN AND CUTTER ASSEMBLY

Referring now to FIGS. 27, 28 and 29, there is shown an anchor pin and cutter assembly, designated generally by the numeral 290, including five cutter mechanisms 47—47. The assembly 290 includes a vertical upright 291 which is fixed to the base plate 51. Secured to the upright 291 are five vertically spaced pin support members 292—292 which project transversely from the upright. One end of each of the pin support members 292—292 is fixed to the upright 291 with the free end extending outwardly above and beyond the axis of a corresponding spindle 30. The pin support members 292—292 are each provided with a central bore for slidably receiving and supporting the associated anchor pin 32. The free end of the anchor pin 32 normally projects axially outwardly beyond the end of the pin support member and is rectangular in cross section. The opposite end of the anchor pin 32 extends through the bore in the pin support member and a corresponding opening in the upright 291 where it is hingedly connected to an associated rocker arm 295 fixed to a vertically extending rocker arm shaft 298. It may be seen that oscillatory movement of the rocker arm shaft 298 results in the alternate retraction and extension of the anchor pins 32—32 relative to their corresponding pin support members 292—292. When the anchor pins 32—32 are retracted, any turns of wire on the anchor pins are stripped off by the pin support members 292—292. Movement of the rocker arm shaft 298 is controlled by means of a double-acting air cylinder 300 (FIG. 29) having its piston rod 301 connected through a suitable linkage to the rocker arm shaft.

Each of the cutter mechanisms 47—47 comprises a set of two cooperating, concentric, sleeve-like cutter elements 305 and 306 received one within the other. The cutter elements of each set are provided with cutout sections normally in registry with one another, as shown in FIGS. 27 and 29. The cutter elements are rotatably mounted concentrically about their respective pin support members 292—292 and are provided with radially projecting lugs 308 and 309 which are hingedly connected to actuator bars 310 and 311, respectively. The actuator bars 310 and 311 are connected at their lower ends to a piston rod 313 of a double-acting air cylinder 315 which controls their vertical movement. Upon operation of the air cylinder 315 to move the piston rod 313 downwardly, the cutter elements of each set rotate angularly in opposite directions until opposed, sharpened cutting edges thereof move into shearing cooperation to sever a span of wire 35 extending from the anchor pin 32 to the guide pin 42 on the associated arbor 30. When the piston rod 313 returns to its normal upward position, the cutting edges 316 and 317 move apart and the cutout sections of the cutter elements 305 and 306 are returned to registry with one another.

BOBBIN LOADING ASSEMBLY

Referring now to FIG. 14, there is illustrated a bobbin loading assembly, designated generally by the numeral 320. The bobbin loading assembly 320 is designed to feed five bobbins simultaneously, one to each of the live centers 77—77 at the start of a machine cycle.

The bobbin loading assembly 320 includes a vertical mounting plate 322 which extends through an elongated slot 323 formed in the base plate 51. The lower end of the mounting plate 322 is attached to a carriage 325 slidably mounted on spaced parallel guide rods 326-326, which are mounted beneath the base plate 51. Movement of the carriage 325 is effected by means of a pivoted lever arm 330 which is connected at its upper end to the carriage 325 by an adjustable link 331. Oscillation of the lever arm 330 is controlled by a cam 333 having a camming slot which engages a cam follower provided on the lever arm 330. The cam 333 is mounted on the camshaft 86.

As best shown in FIG. 14, the portion of the mounting plate 322 which extends above the base plate 51 carries five bobbin pickup arms 335-335, each of which is designed to engage a leading bobbin 10 at the discharge end of a corresponding one of five bobbin feed chutes 338—338, cradle the bobbin and transport the same from the discharge end of the feed chute to a position axially aligned with the longitudinal axis of the corresponding live center 77. As shown in detail in FIG. 30, each bobbin pickup arm 335 includes a pair of upstanding, spaced furcations which have U-shaped cutouts for nesting the drum 11 of a bobbin 10 with the outer faces of the furcations against the inside faces of the flanges 12 and 13 on the bobbin.

As may be seen in FIG. 30, the feed chutes 338—338 include track members having passageways 340—340 complementary in shape to the drums 11—11 of bobbins 10—10. At the discharge end of each of the track members 340—340, an escapement member 341 is mounted having a passageway communicating with the passageway in its associated track member. A step 344 is formed in the passageway so that the leading bobbin 10 normally strikes the step and must be lifted vertically before it can be moved horizontally through an exit passageway toward the bobbin load position. At the step 344, the drum 11 of the leading bobbin 10 is normally held against the bottom of the passageway by a weighted yoke 345 mounted on a pivoted arm 347. The feed chutes 338—338, including the feed track members 340—340 and escapement members 341—341, are mounted fixedly to a vertical, feed-chute support plate 350. A shouldered, slidable plunger 352 extends through an opening formed in the top of each of the escapement members 341-341 so that it protrudes slightly into the exit passageway. Whenever a bobbin 10 is carried through the exit passageway, the plunger 352 is moved upwardly to operate a corresponding one of five detector microswitches 361 to 365, inclusive.

A spring-loaded dog 367 pivotally attached to each of the pickup arms 335-335 assists the feed of a bobbin 10 immediately behind the leading bobbin to insure the latter is properly seated behind the step 344 preparatory to the next bobbin loading operation.

Referring again to FIG. 30, it may be seen that each of the pickup arms 335-335 is mounted at one end of an associated bell crank 370. The bell cranks 370-370 are mounted at their intermediate pivot points on pivot shafts 371-371 suitably journaled one above the other on the mounting plate 322. The distal ends of the bell cranks 370—370 are connected operatively to a common, vertically reciprocable operating member 373. In addition, as shown in FIG. 14, the middle one of the bell cranks 370—370 has an extension connected by a linkage 374 to a piston rod 375 of a double-acting air cylinder 376. The lower end of the operating member 373 is arranged to strike an adjustable pin 378 which is threadedly received within a bracket 380 secured to the mounting plate 322. The pin 378 serves to limit the downward travel of the operating member 373.

At the start of a cycle, the mounting plate 322 is at the rear of the elongated slot 323 (as illustrated in FIG. 14) and each of the bobbin pickup arms 335—335 is positioned so as to be engaging and cradling the drum 11 of a bobbin 10 and holding the same elevated so that it is aligned with the exit passageway. Thereupon, when the mounting plate 322 is moved forward to the front end of the slot 323, each of the cradled bobbins 10—10 is moved horizontally out of the respective exit passageway and into precise alignment with the common axis of the corresponding live center 77 and spindle 30, as shown in FIG. 30.

The tail stock assembly 80, which previously was retracted to the right as viewed in FIG. 13, is moved to the left by the cam 85 and the reduced tip portions on the mandrels 98—98 of the live centers 77—77 are thrust into closely fitting engagement within the bores 27—27 of the bobbins 10—10 cradled and positioned by the bobbin pickup arms 335—335. The air cylinder 376 then operates to pivot the bell cranks 370—370 counterclockwise, as viewed in FIG. 14, to drop the bobbin pickup arms 335—335 so that they clear the bobbins 10—10 now engaged on the mandrels 98—98 so as to permit the mounting plate 322 to be returned to the back of the slot 323 and continuing leftward movement of the tail stock assembly 80 thrusts the bobbins 10—10 into driving engagement with spindles 30—30. After returning to the back of the slot 323, the air cylinder 376 is actuated again to pivot the bell cranks 370—370 clockwise, as viewed in FIG. 14, to cause each of the bobbin pickup arms 335—335 to engage a new bobbin preparatory to the next cycle.

UNLOADER CONVEYOR ASSEMBLY

Referring to FIGS. 12 and 14, there is shown an unloader conveyor assembly, designated generally by the numeral 385. The unloader conveyor assembly 385 includes five receiver chutes 386 to 390, inclusive, which are attached between side plates 391 and 392. Journaled between the side plates 391 and 392 are a drive pulley 395 and an idler pulley 396 around which an endless conveyor belt 398 is entrained. The drive pulley 395 is driven by an unloader drive motor 400 which is mounted to the side plate 392. When energized the motor 400 drives the endless belt 398 continuously in a direction such that the upper run travels in the direction indicated by the arrow in FIG. 14. The lower ends of the receiver chutes 386 to 390, inclusive, are spaced directly above the surface of the upper run of the conveyor belt 398.

Parallel guide rods 401—401 are provided to facilitate transverse movement with respect to the axes of the live centers 77—77. When the assembly 385 is in its extended position, the open, upper ends of the receiver chutes 386 to 390, inclusive, are positioned directly under and immediately adjacent to the bobbins 10—10 detachably mounted on the live centers 77—77, so that, when the wound bobbins are stripped from the respective mandrels 98—98 upon retraction of the latter within their associated stripper members 101—101, the wound bobbins drop through the open ends of the respective receiver chutes and are deposited on the moving conveyor belt 398. Movement of the assembly to and from its extended position is controlled by a cam 405 mounted on the camshaft 86. The cam 405 operates a crank arm 406 which, in turn, is fixed to a vertical shaft 408. The cam 405 is designed to impart oscillatory movement to the shaft 408, which movement is, in turn, converted through a crank arm 409 and connecting member 410 into horizontal reciprocation of the assembly 385.

TAPING ASSEMBLY

A taping assembly, designated generally by the numeral 415, is shown in detail in FIGS. 31 and 32. The taping assembly 415 includes a movable carriage 416 mounted on guide rods 418—418 supported beneath the base plate 51. The guide rods 418—418 extend transversely with respect to the rotational axes of the spindles 30—30 so that movement of the carriage 416 is radial with respect to the bobbins 10—10 mounted thereon. As best seen in FIG. 31, a cam follower 419 engages a cam 420 driven by an auxiliary drive shaft 422.

A mounting block 425 is secured to the movable carriage 416 and projects through an elongated, transversely extending slot 427 in the base plate 51. Attached to the mounting block 425 is a vertical mounting plate 428 which serves as a support for five individual taping units 430—430. The taping units 430—430 are substantially identical in design and construction. Each of the taping units 430—430 comprises a pair of spaced, parallel support rods 431—431 slidably mounted in a support block 432 which, in turn, is secured to the mounting plate 428. A bracket member 435 is fixed to the forward ends of the support rods 431—431 and serves to mount a head block 436 which, in turn, carries a rubber-surfaced, tape-applicator roller 438 freely rotatably on a roller shaft 440 between journal plates fixed to opposite sides of the head block 436. The leading end of a pressure-sensitive insulating tape 441 extends from a supply roll 442 over the flat, horizontal, upper surface of the head block 436 into contact with the roller 438. The adhesive-coated side of the insulating tape 441 is up so that the uncoated side is in contact with the surface of the roller 438. Anti-backlash rollers 449—449, which are silicon rubber-surfaced, are provided and lightly engage the adhesive-coated side of the tape. The tape supply roll 442 is mounted on a free-wheeling arbor suitably journaled in a mounting member 450 secured to the rear ends of the support rods 431—431. As is best illustrated in FIG. 32, the support rods 431—431 are resiliently urged forward against stop collars 451—451 by compression springs 452—452 mounted on the support rods between the bracket member and the support block.

An oscillatable yoke 453 is suitably mounted on extending ends of the roller shaft 440. A side leg of the yoke 453 is fixed to a pinion gear 455 also mounted on the roller shaft 440. The pinion gear 455 engages a toothed rack 456 secured to the free end of a piston rod of a double-acting air cylinder 460 which is fixed to the side of the head block 436. With the piston rod 457 fully retracted, the yoke 453 is held in a position shown in solid outlines in FIG. 32. Upon actuation of the piston rod 457 to its extended position, the yoke 453 rotates angularly approximately 90° clockwise, as viewed in FIG. 32, to move a serrated cutter blade 461 attached to the yoke against and through a span of the insulating tape 441 extending between the roller 438 and the wound coil on a bobbin 10. A brush 463 with extending bristles is mounted behind the cutter blade 461 and is arranged to wipe the severed end of the insulating tape 441 against the wound coil after the cutter blade has moved past.

During a taping cycle, the cam 420 drives the carriage 416 in until the rollers 438—438 of the taping units 430—430 press the respective, adhesive-coated tapes 441—441 against the slowly rotating surfaces of the wound electrical coils. After a half turn of tape has been applied to the coils, the cam 420 moves the carriage 416 outwardly a short predetermined distance to permit the serrated cutter blades 461—461 to sever the thus formed tape spans, as best illustrated in phantom outline in FIG. 32. A suitable, cam-actuated, electrical switch operates after a predetermined length of tape has been applied to each coil by controlling the operation of the air cylinder 460 and, thus, the operation of the cutter blades 461—461. After the tapes have been severed and wiped by the brushes 463—463, continued movement of the cam 420 moves the carriage to the extreme outward position where it is ready for the next cycle.

MACHINE DRIVE SYSTEM

Referring now to FIG. 33, there is shown a schematic diagram of a machine drive system which includes a main drive motor 465. The output shaft of the motor 465 is connected through mechanical speed change unit 467, comprising a combination of electrically operated friction clutches 468 and 469 and interconnecting timing belt drives, to a main drive shaft 470. A timing belt drive connects the main drive shaft 470 to the spindle drive shaft 57. The main drive shaft 470 also connects, through timing belt drives, a winding pitch adjusting unit 473, a worm gear unit 474, and a drive reversing mechanism worm and worm gear unit 474, and a drive reversing mechanism 475 to the fine traverse drive shaft 135.

The drive reversing mechanism 475 comprises a pair of parallel shafts driven through two bevel gears 477 and 478 and two electrically operated friction clutches 481 and 482, and a pair of meshing spur gears 483 and 484. The reversing is effected by alternately energizing one or the other of the friction clutches 481 and 482. The rapid traverse drive shaft 175 is connected to the main drive shaft 470 through a similar driving connection with the omission of a winding pitch adjusting unit. The direction of drive of the rapid traverse drive shaft 175 depends upon which one of two friction drive clutches 486 and 487 is energized. In the operation of the preferred embodiment herein described, only the clutch 486 is utilized to drive the rapid traverse drive shaft to the left, as viewed in FIG. 13.

The auxiliary drive shaft 422, which controls movement of the taping assembly 415, is driven from the main drive shaft 47 through timing belt drives connected operatively by an electrically operated friction clutch and friction brake unit 490. The unit 490 includes an electrically controlled clutch 491 and brake 492.

CONTROL SYSTEM AND OPERATION

Referring now to FIG. 34, there is shown a block diagram of an electrical control system for controlling the operation of the coil winding machine. The control system includes a photocell input unit 500 for generating an electrical pulse for each 360° rotation of the spindles 30—30. A three-bladed, light chopper 502 located in the housing 54 (FIG. 16) is driven rotatably by the spindle drive shaft 57 at one-third the speed of the bobbins 10—10. The blades of the chopper 502 interrupt a light beam passing between a light source 504 and a resistive photocell 505 in the photocell input unit 500. The pulse, generated by the photocell 505 going dark, is amplified and shaped by an input amplifier-pulse shaper 506 in the photocell input unit 500 and is then fed to an electronic counter unit 508.

The counter unit 508 comprises a primary counter 510, including five glow transfer decade counting tubes (type 6476A) 511 to 515, inclusive (FIGS. 35A to 35D, inclusive), one tube being for each digit of a five-digit count, and a secondary counter 520, including two glow transfer decade counting tubes 521 and 522, one for each digit of a two-digit count, as shown in FIGS. 35A to 35D, inclusive. The electronic counter unit 508 also includes seven counter output relays designated CR1A, CR1B, CR1C, CR2A, CR2B, CR2C and CR2D, respectively, the counter output relays being connected to the decade counting tubes for operation at different preset counts programmed by manually presetting each of twenty-three rotary switches 530–530 grouped in seven switch banks. The first five switch banks form part of the primary counter 510 and the remaining two switch banks form part of the secondary counter 520.

Corresponding contacts of the rotary switches in each bank are connected in parallel to the respective cathode of the corresponding decade counting tube.

As shown in FIGS. 35A and 35B, the top horizontal row of five rotary switches 530–530 of the five switch banks associated with the primary counter 510 form a preset for controlling the energization of counter output relay CR1A, the second row controlling counter output relay CR1B and the third row controlling counter output relay CR1C. Similarly, the top horizontal row of two rotary switches of the two switch banks associated with the secondary counter 520 form a preset controlling the energization of the counter output relay CR2A, the second, third and fourth rows controlling counter output relays CR2B, CR2C and CR2D, respectively. In operation, when the preset count on a particular row is reached, the counter output relay associated with that row is energized.

Referring in detail to FIGS. 35A to 35D, inclusive. it may be seen that each of the counter output relays, for example, counter output relay CR1A, is connected in series with a relay driver tube 531. The grid of the relay driver tube 531 is biased negative and is normally held off. When the count on the decade counter tubes coincides with the preset count determined by the settings of the associated row of rotary switches 530—530, coincidence diodes 535—535 connected to the grid of the relay driver tube conduct simultaneously and the grid goes positive causing the relay driver tube 531 to conduct and energize the counter output relay CR1A. It may be seen by reference to FIGS. 35A to 35D, inclusive, that counter output relays CR1C, CR2A and CR2B hold when they are energized, whereas the other counter output relays are only energized so long as the actual count and the preset are coincidental.

The counter output relays CR1A, CR1B, CR1C, CR2A, CR2B, CR2C and CR2D have associated contacts connected into a stepping switch and control relay unit 540 which, in turn, controls the sequence of operation of the various electrically operated parts of the coil winding machine 50 to achieve automatic control. Feedback control from the coil winding machine to the stepping switch and control relay unit is achieved by means of the conditions of various switches heretofore and hereinafter to be described.

The unit 540 (FIGS. 37A to 37F, inclusive) includes a conventional stepping switch having four decks A, B, C and D, respectively, each deck comprising forty contacts swept sequentially by associated contact wipers 552—552. Deck A of the stepping switch controls the the stepping operation by connecting a stepper coil 553 through the wiper 552 associated with Deck A to a 28-volt D.C. supply arranged to be connected to the various contacts of Deck A to advance the wiper step-by-step at the correct time. Deck B controls various machine functions requiring 28 volts D.C. for operation. Deck C controls the vertical positioning of the wire guide tubes 40—40 and the operation of the wrapping carriage 240. Deck D controls various machine function requiring 110 volts A.C. for operation.

In order to describe the operation of the winding machine 50 and its control system, it will be assumed that a start button 555 (FIG. 37A) has been depressed to energize the stepper coil 553, through a normally closed contact of a relay K–2 and a normally closed interruptor spring contact 556 of the stepping switch, causing the wipers 552—552 of the stepping switch to drive to Step #1 contacting the first contacts of the respective Decks A, B, C and D. Another normally open interruptor spring contact 557 is provided to control reset coils KR–3 and KR–4 for relays KL–3 and KL–4, respectively. It will be understood that the contact 556 opens and the contact 557 closes momentarily during each stepping operation of the stepping switch.

With the wipers 552—552 in Step #1, the operating coil of a relay K–1 is energized through the start button 555 and the wiper 552 of Deck A. The relay K–1 pulls in and holds through one of its normally open contacts and an emergency stop button 558. Another normally open contact of the relay K–1 closes to apply 28-volt D.C. power to a bus 560 and simultaneously energizes the operating coil of the relay K–2 which pulls in and breaks the path of the start button 555. Still another normally open contact of the relay K–1 is closed to energize a 110–volt A.C. bus 561 and starts the camshaft drive motor 87 and the unloader drive motor 400. The operating coil of a relay K–9 is also energized to close its normally open contacts to connect the main drive motor 465 to a 220-volt power supply. The main drive motor 465 operates continuously as long as the relay K–1 is operative. By virtue of the connection through the momentarily depressed start button 555 and the operating coil of relay K–1, the stepper coil 553 is energized to drive the wipers 552—552 onto Step #2.

In Step #2 a valve solenoid 566 controlling air cylinder 68 is energized to move the top spindle detent 66 in against the notched spindle positioning cam 64. Simultaneously, another valve solenoid 567 controlling air cylinder 69 is energized to pull the side spindle detent 67 out of the notch of the spindle positioning cam 65. At this time microswitch 72, which was held open by the side spindle detent 67, closes to energize the operating coil of a relay K–3. A normally open contact of the relay K–3 closes to energize the clutch 468 to connect the main drive shaft 470 to the drive motor 465, causing rotation of the spindle drive shaft 57. The microswitch 71, which had been held open when the top spindle detent 66 was fully retracted, closes and, when one of the normally open contacts of the relay K–3 closes, the stepper coil 553 is energized to drive the wipers 552—552 into Step #3.

As soon as the spindle shaft 57 has completed one-half revolution, the top spindle detent 66 drops into the notch on the spindle positioning cam 64 and microswitch 70 opens to deenergize the relay K–3 which drops out and deenergizes the clutch 468 and energizes the stepper coil 553 through its normally closed contact to drive the wipers 552—552 through Step #4 to Step #5. During Step #3, the 180° revolution of the spindles 30—30 places the bobbins 10—10 in the position shown in FIG. 3.

In Step #5 a valve solenoid 570 is energized through a normally closed contact of a latching relay KL–1. Energization of the valve solenoid 570 operates the air cylinder 92 to pull out the load camshaft detent 91 which, in turn, trips and closes a microswitch 571 to complete the circuit to the clutch 88. The camshaft 86 now begins to rotate and, as it does, a cam-operated microswitch 572 is opened, the cam 85 moves the tail stock assembly 80 rightwardly to its fully retracted position and a cam-operated microswitch 573 is then closed to energize a valve solenoid 574 which operates the air cylinder 117 causing wound bobbins from the previous winding cycle to be stripped from the mandrels 98—98 and fall into the receiver chutes 386 to 390, inclusive, which were driven in by the cam 405. Continued rotation of the camshaft 86 retracts the receiver chutes 386 to 390, inclusive, and then the bobbin pickup arms 335—335 are driven in. Subsequently, the tail stock assembly 80 moves leftwardly to move the mandrels 98—98 into engagement with five empty bobbins supported by the pickup arms. A cam-operated microswitch 575 is then closed to energize a valve solenoid 577 causing the air cylinder 376 to drop the pickup arms 335—335 out of the way. As the tail stock assembly 80 is driven in, a cam-operated microswitch 579 is closed momentarily thereby energizing a latching relay KL–1. When the relay KL–1 latches in, a normally closed contact is held open and breaks the circuit of the valve solenoid 570 causing the camshaft detent 91 to drop against the rim of the cam 90. When the tail stock assembly 80 is fully in with the bobbins held against the winding arbors, the load camshaft detent 91 drops into the notch on the cam 90 and the microswitch 571 reopens to deenergize the clutch 88. The microswitch 575 is opened by its associated cam and the valve solenoid 577 is again deenergized to operate the air cylinder 376 so as to cause the bobbin pickup arms 335—335 to be brought up. At the same time that the camshaft detent 91 drops into the notch on the cam 90, the microswitch 572 recloses and the stepper coil 553 is again energized through a now-closed, normally open contact of the latching relay KL–1 and the wipers 552—552 are driven to Step #6.

During the Step #5, as the bobbin pickup arms 335—335 moved in, the detector microswitches 361 to 365, inclusive, were tripped provided that each of the bobbin pickup arms received a bobbin. The last-mentioned microswitches are connected in series with the operating coil of a latching relay KL–2; thus, if all of these microswitches are tripped and closed, the relay KL–2 latches in. In the event that the bobbin load is incomplete, an "incomplete bobbin load" lamp is lighted, and pressing a reload button 590 while the stepping switch is at Step #6 will energize the valve solenoid 570 to repeat the bobbin loading portion of the cycle. Assuming that a complete bobbin load was present and indicated, the closing of a normally open contact of relay KL–2 advances the wipers 552—552 through Step #6 into Step #8.

In Step #8 the reset coils KR–1 and KR–2 of latching relays KL–1 and KL–2, respectively, are energized to release and reset the latter in preparation for the remainder of the cycle. The contact finger 232 of the vertical position sensing unit is in electrical contact with the "DOWN" bar 227 of the vertical position sensor 225. The relay K–5 is energized closing the circuit of the vertical drive motor 220 through its now-closed, normally open contact. The closing of other normally open contacts of the relay K–5 completes the circuit to the clutch 223 and simultaneously the opening of a normally closed contact of the relay K–5 releases the brake 224. A latching relay KL–3 is energized through a now-closed contact of the relay K–5 and a normally open contact of the relay KL–3 is latched in.

Energization of the vertical drive motor 220 and clutch 223 causes the vertical carriage 215 to drive down, the position sensing bars 227 and 228 attached to the carriage traveling with it. The contact finger 232 enters the gap between the bars and the microswitch 237, which is operated by the cam 235, is transferred over supplying holding current to the relay K–5 through a now-closed, normally open contact of the relay K–5 off the bar 227. The motor 220 continues to drive and when the microswitch 237 drops into the notch in the cam 235 it transfers and the relay K–5 is deenergized and releases thereby opening the circuits to the vertical drive motor 220 and the clutch 223, reenergizing the brake 224 and stopping the carriage. Energization of the stepper coil 553 advances the wipers 552—552 through Step #9 into Step #10.

It will be understood that as the vertical carriage 215 moves down the wire guide tubes 40—40 move from their initial positions at the anchor pin level, wherein they are immediately adjacent to their corresponding anchor pins 32—32, to the arbor pin level wherein the wire guide tubes are positioned immediately adjacent to their corresponding arbor pins 31—31. During this movement, the wires, the ends of which were wrapped about the anchor pins 32—32 in the previous cycle, are pulled through their associated wire guide tubes 40—40, so that a span of wire extends from each of the anchor pins 32—32 to a point immediately adjacent to the corresponding arbor pin 31.

In Step #10 a relay K–6 is energized through the wiper 552 of the Deck C and a normally closed contact of a latching relay KL–4. A normally closed contact of the relay K–6 opens to release the wrapping motor brake 265 and a normally open contact of the relay K–6 closes to energize the wrapping motor 255. As the motor 255 begins to revolve the wrapping carriage 240, the microswitch 260 lifts out of the notch in the cam 262 and its contacts transfer to energize the relay KL–4 which latches in and to hold in the relay K–6. The revolving movement of the wrapping carriage 240 causes each of the wire guide tubes 40—40 to orbit about its corresponding arbor pin 31 and wrap its associated wire thereabout. After two complete wraps have been made, the microswitch 260 drops back into the notch on the cam 262 to release the relay K–6, reenergize the brake 265 and deenergize the wrapping motor 255. When the microswitch 260 drops back into the notch on the cam 262, the stepper coil 553 is again energized to drive the wipers through Step #11 and Step #12.

At Step #12 a valve solenoid 592 is energized to operate the air cylinder 150 to move the piston rod 148 to its retracted position and, thus, moving the horizontal carriage 145 the predetermined distance to the right to carry each of the wire guide tubes 40—40 to a position slightly above and substantially in alignment with the slot 20 in the flange 12 of the corresponding bobbin 10. When the horizontal carriage 145 reaches this predetermined position, the microswitch 159 is closed to energize the stepper coil 553 and drive the wipers 552—552 through Step #13 to Step #14.

In Step #14, the contact finger 234 is in electrical contact with the bar 227 of the vertical position sensor 225 and the relay K–5 is again energized and closes the circuit of the vertical drive motor 220. Simultaneously, the clutch 223 is energized and the brake 224 is released. The vertical carriage 215 is driven downwardly carrying with it the position sensing bars 227 and 228 until the contact finger 234 enters the gap between the bars. The microswitch 237 is operated by the cam 235 and is transferred over to supply holding current to the relay K–5 through a normally open contact of the relay K–5 and the "DOWN" bar 227. The motor 220 continues to drive until the microswitch 237 is again operated by dropping into the notch on the cam 235 whereupon it transfers and the relay K–5 is deenergized, the motor 220 and clutch 223 are opened, and the brake 224 is applied to stop the vertical carriage 215. The operation of the microswitch 237 also energizes the stepper coil 453 to advance the wipers 452—452 to Step #15.

The downward movement of the vertical carriage 215 in Step #13 moves each of the wire guide tubes 40—40 downwardly below the axis of the corresponding bobbin to a horizontal plane (slot lead-in level) substantially below the lowermost winding surface of the bobbin drum to position the wire for reception in the slot 20.

In Step #15 a relay K–7 (see FIGS. 35D and 37B) is energized to apply ground to a reset-inhibit pulse generator circuit 600 through one of the now-closed, normally open contacts of the relay K–7 and thereupon the counter unit is reset to zero. A normally closed contact of the relay K–7 in a relay holding line 601 (FIG. 35D) opens and the counter relays CR1C, CR2A, and CR2B drop out. Also, the closure of a normally open contact of the relay K–7 energizes the stepper coil 553 to drive the wipers 552—552 ahead of Step #16.

In Step #16 a valve solenoid 605 is energized to operate the air cylinder 155 to pull the fine traverse detent 153 out of the notch in the locking cam 152. The movement of the detent 153 throws the microswitch 156 to energize the latching relay KL–5. The normally open contacts of the relay KL–5 close to energize the fine traverse clutch 481 and also partially complete the circuit to the rapid traverse clutch 486. The microswitch 156 also energizes the stepper coil 553 to advance the wipers 552—552 through Step #17 to Step #20.

In Step #20 a valve solenoid 607 is energized to pull the top spindle detent 66 out of the notch on the spindle positioning cam 64. This causes the microswitch 70 to reclose and complete the path to the relay K–3 through the now-closed microswitch 72. With the relay K–3 energized, the circuit to the clutch 468 is completed through a now-closed, normally open contact of the relay K–3 and a normally closed contact counter output of relay CR2B. With the clutch 468 energized, the spindles 30—30 now begin to rotate and an electrical pulse is generated by the photocell input circuit 500 for each complete rotation. As the spindles 30—30 rotate, the wire is guided into the groove 20 on each of the bobbins 10—10 and down to the winding surface of the drum 11, whereupon the winding continues with the rotation of the spindle at a predetermined, relatively low speed (e.g., 150 r.p.m.). When a preset count is reached (e.g., two turns) the counter output relay CR1A is energized ro energize a valve solenoid 609 through a now-closed, normally open contact of the relay CR1A. The operation of the valve solenoid 609 operates the air cylinder 278 controlling the radial carriage 275. The piston rod of the air cylinder 278 moves to retract each of the wire guide tubes 40—40 a short distance in a horizontal direction outwardly from the winding surface of the drum 11 to get a better exit angle on the wire with respect to the wire guide tube. As the radial carriage 275 is pulled back, the microswitch 280 is tripped to close a contact 280a and the relay K–11 is energized. The closing of a normally open contact of relay K–11 and the opening of a normally closed contact thereof in a wire tension control circuit, changes the resistance in the field of each of a plurality of eddy-current clutches 610—610 associated with the wire supplies 41—41, so as to increase the tension on the individual wires to a predetermined "high" tension. A now-closed, normally open contact of the relay K–11 energizes the stepper coil 553 to drive the wipers 552—552 through Step #21 to Step #22.

In Step #22 the relay K–10 is energized through a normally closed contact of the counter output relay CR1B. Normally closed contacts of the relay K–10 in a low-speed circuit of a motor speed control unit 612 open, and normally open contacts of the relay K–10 in a high-speed circuit close whereupon the main drive motor 465 which is driving the spindles 30—30 accelerates to its high speed, for example, approximately 10,000 r.p.m. Simultaneously, voltage is applied through the contact finger 232, which is now in contact with the "UP" bar 228 and thereupon relay K–4 and the latching relay KL–3 are energized. Closing of normally open contacts of the relay K–4 energize the relay K–13, the contacts of which transfer in the circuit of the vertical drive motor 220. Also, the brake 224 is deenergized and the clutch 223 is energized. Normally open contacts of the relay K–13 close to complete the circuit to the vertical drive motor 220 and the vertical carriage 215 is driven upwardly. As the contact finger 232 enters the gap between the position sensing bars 227 and 228, the microswitch 237 provides a holding path through a normally open contact of the relay K–4, which is now closed, for the relay K–4. Thereafter, when the microswitch 237 drops into the notch on the cam, the relay K–4 is deenergized and, in turn, deenergizes the clutch 223 and the relay K–13. The normally open contacts of the relay K–13 break the circuit to the vertical drive motor 220 and the motor stops and the brake 224 is again energized. The wire guide tubes 40—40 are now positioned in a horizontal winding plane (coincident with the arbor pin level) for winding at high speed on their respective bobbins 10—10.

The horizontal traverse movement of the wire guide tubes 40—40 continues in synchronism with the rotation of the bobbins 10—10 to place uniform, closely packed, helical turns of wire on the drums of the respective bobbins. This traverse movement of the wire guide tubes 40—40 is alternately reversed as the wire guide tubes reach the extremities of the drums 11—11 adjacent to the inside surfaces of the flanges 12 and 13, so that as the winding proceeds a plurality of uniformly wound, superimposed layers are formed. The reversal of the horizontal carriage 145 is accomplished through the actuation of the switch 195 which is mounted within the head of the driver 138. As the wire guide tubes 40—40 reach a position wherein they are immediately adjacent to one of the flanges 12 or 13 of the bobbin, the switch 195 is thrown by the actuator 192 striking the plunger 186 or the plunger 199. The switch 195 is a two-way switch and in one position it energizes the clutch 481 which operates to drive the traverse carriage to the right and in its other position energizes the clutch 482 to drive the horizontal carriage 145 to the left. Thus, it may be seen that the carriage 145 is automatically reversed at the extremes of the travel of the wire guide tubes 40—40.

The high-speed winding operation (e.g., 10,000 r.p.m.) continues until the CR1B preset count (e.g., 6600 turns) is reached and at this time the normally open contacts of the counter output relay CR1B close to complete the circuit for the stepper coil 553 and advance the wipers 552—552 to Step #23.

In Step #23, the relay K–15 is energized through normally closed contacts of the counter output relay CR1C. Energization of the relay K–15 transfers the motor speed control unit 612 to a medium speed circuit and the main drive motor 465 runs at medium speed (approximately 2000 r.p.m.) for a predetermined number of turns until the CR1C preset count (e.g., 6760 turns) is reached, at which time the counter output relay CR1C is energized and holds in and the relay K–15 drops out returning the main drive motor 465 to its low-speed condition. Contacts of the counter output relay CR1C in the cathode of the X–1 secondary drive tube close and the secondary counter begins counting with the primary counter. When the CR2A preset count (e.g., 10 turns) is reached, a contact of the counter output relay CR2A closes and the stepper coil 553 is again energized and the wipers 552—

552 are driven to Step #24. When the counter output relay CR2A pulls in, it holds (see FIG. 35C) and the circuit through the now-closed, normally open contact of the latching relay KL–5 and the now-closed, normally open contact of the relay CR2A energizes the rapid traverse drive clutch 486 to cause the rapid traverse drive rod 170 to move rapidly to the left, carrying with it the carriage 165. When the carriage 165, which is moving much faster than the driver 138, catches up with the driver, the actuator of the override microswitch 202 is struck and the microswitch 202 opens to deactivate the clutch 481 or the clutch 482, disengaging the fine traverse drive rod 125 from its drive. Thereafter, the horizontal carriage 145 is carried leftward by the carriage 165 until the wire guide tubes 40—40 have been driven to the flanges 12—12 of the bobbins 10—10. At this time a rapid traverse limit switch 620 closes to energize a valve solenoid 621 which operates the air cylinder 155 to move the fine traverse detent 153 into the notch in the locking cam 152. As the detent 153 enters the notch, it operates the microswitch 156 to energize the reset coil KR–5 to reset the latching relay KL–5 and the paths to the clutches 481, 482 and 486 are opened, whereupon the carriage 163 is spring-returned to the right stop.

It will be understood that the number of turns placed on the bobbins 10—10 during the elapsed time from the start of the leftward movement of the rapid traverse carriage 165 until the carriage stops, is always the same and may be fixed at a predetermined number (e.g., 20 turns). Thus, the wire guide tubes 40—40 are always positioned at the inside of the flanges 12—12 at a predetermined turn count.

In Step #24, the contact finger 233 is against the "DOWN" bar 227 of the vertical position sensor 225 and the relay K–5 is energized and, in turn, energizes the vertical drive motor 220. Energization of the relay K–5 closes its normally open contacts to complete the circuit to the clutch 223. A normally closed contact of the relay K–5 opens releasing the brake 224. The relay KL–3 is energized through a contact of the relay K–5 and the now-closed contact of the relay KL–3 conditions the stepper coil 553 for subsequent energization. With the clutch 223 energized and the brake 224 deenergized, the vertical carriage is driven downwardly by the vertical drive motor 220. The bars 227 and 228 attached to the vertical carriage 215 travel with it and the contact finger 233 enters the gap between the "UP" and "DOWN" bars. The microswitch 237 is transferred over supplying holding current to the relay K–5 through a now-closed, normally open contact of the relay K–5. The vertical drive motor 220 continues to drive. When the microswitch 237 drops into the notch in the cam 235, it transfers and the relay K–5 is deenergized and the vertical drive motor 220 and the clutch 223 are deenergized. Simultaneously, the brake 224 is again energized and the vertical carriage 215 stops. The latter movement of the vertical carriage 215 drives the wire guide tubes 40—40 downwardly to their respective lead-out levels.

Subsequently, when the CR2B preset count (e.g., 30 turns) is reached, the counter output relay CR2B pulls in and holds (FIG. 35C). When energized, contacts of the counter output relay CR2B transfer and the low-speed clutch 469 is energized and the high-speed clutch 468 is deenergized. Subsequently, when the CR2C preset count (e.g., 35 turns) is reached, the counter output relay CR2C is energized to operate a latching relay KL–6, contacts of which close to energize the clutch 491 and to deenergize the brake 492, and to commence a taping cycle wherein a wrapping of the tape 441 is applied to each of the coils wound on the bobbins 10—10. The now-closed, normally open contacts of KL–6 complete the energization of the stepper coil 553 and the wipers 552—552 advance to Step #25.

In Step #25 the taping cycle continues and at the proper time a microswitch 625 operated by a cam 626 operates a valve solenoid 628 to operate the air cylinders 460—460. The operation of the air cylinders 460—460 moves the cutter blades 461—461 against and through their associated tapes 441—441 to sever the same. Then, with the tape cycle completed, a microswitch 630 operated by a cam 631 closes to energize reset coil KR–6 which, in turn, resets the relay KL–6. Contacts of the relay KL–6 then transfer to energize the brake 492 and to deenergize the clutch 491. Subsequently, when the CR2D preset count (e.g., 40 turns) is reached, the counter output relay CR2D is energized to operate a valve solenoid 634. Energization of the valve solenoid 634 operates the air cylinder 69 bringing in the side spindle detent 67. When the side spindle detent 67 enters the notch in the spindle positioning cam 65, the microswitch 72 is tripped and opened to deenergize the relay K–3. Power to the clutches 468 and 469 is cut off by a normally open contact of the relay K–3, and the spindles 30—30 are stopped to position the bobbins 10—10 precisely, as shown in FIG. 9. The normally closed contacts of the relay K–3 complete the energization of the stepper coil 553 to advance the wipers 552—552 to Step #26.

When the wipers 552—552 advance to Step #26, the wiper of Deck D energizes a valve solenoid 635 which operates the air cylinder 278 to move the radial carriage 275 in, so as to cause the wire guide tubes 40—40 to be driven in toward the respective bobbins. When the wire guide tubes 40—40 are fully forward, the switch 280 is tripped to close a contact 280b and to open the contact 280a which energizes a valve solenoid 638. The opening of contact 280a deenergizes the relay K–11 to decrease the tension on the wires to the predetermined "low" value. The closing of contact 280b operates the air cylinder 150 causing the piston rod 148 to extend. Thus, the horizontal carriage 145 is moved to the left carrying the wire guide tubes 40—40 to the anchor pin plane and, in turn, carrying the wires under the guide pins 46—46. When the wire guide tubes 40—40 reach the plane of the anchor pin, the microswitch 162 closes to energize the stepper coil 553 causing the wipers 552—552 to be driven through Step #27.

In Step #30 power is applied to a valve solenoid 640 which operates the air cylinder 300 to retract the anchor pins 32—32 and scrap turns of wire which were left thereon during the previous cycle are stripped off. The contact finger 231, which is now against the "UP" bar 228, energizes relays K–4 and KL–3 which pull in. The normally open contacts of the relay K–4 close to energize the relay K–13 causing the contacts of the relay K–13 in the circuit of the vertical drive motor 220 to transfer. Normally closed contacts of the relay K–4 deenergize the brake 224 and normally open contacts of the relay K–4 close to complete the path to the clutch 223. With the relay K–13 energized, its normally open contacts complete the circuit to the vertical drive motor 220 and the vertical carriage 215 drives up. As the contact finger 231 enters the gap between bars 227 and 228, the microswitch 237 provides a holding circuit through normally open contacts of the relay K–4 providing a holding path for the relay K–4. Finally, when the microswitch 237 drops into the notch on the cam 235, the relay K–4 releases deenergizing the clutch 223 and the relay K–13. The normally open contacts of the relay K–13 in the motor circuit break and the vertical drive motor 220 stops. The normally closed K–4 contacts complete the path to the brake 224 through the microswitch 237 and the normally closed contacts of relay K–5.

During the last-mentioned movement of the vertical carriage 215, the wire guide tubes 40—40 are carried up in the anchor pin plane to a position immediately adjacent to the respective anchor pins 32—32 at the anchor pin levels. The stepper coil 553 is again energized to advance the wipers 552—552 through Step #31 to Step #32. At this time, the valve solenoid 640 is deenergized to operate air cylinder 300 to return the anchor pins 32—32 to their extended positions.

In Step #32 the wires are wrapped about the anchor pins 32—32 in the following manner. Power is applied through normally closed contacts of the relay KL–4 to pull in the relay K–6. Normally closed contacts of the relay K–6 open to release the wrap brake 265 and normally open contacts of the relay K–6 close to start the wrapping motor 255. As the wrapping motor 255 begins to drive, the microswitch 260 lifts out of the notch in the control cam 262 and its contacts transfer to energize the latching relay KL–4 which latches in and holds the relay K–6 energized. After two wraps have been made, the microswitch 260 drops back into the notch on the control cam 262 releasing the relay K–6. The brake 265 is energized and the wrapping motor 255 is deenergized. At this point the wrap is complete with two turns having been placed on each of the anchor pins 32—32. When the microswitch 260 drops into the cam notch after the wrapping operation is complete, the stepper coil 553 is energized through the now-closed, normally open contacts of the relay KL–4 to advance the wipers 552—552 through Step #33 to Step #34.

In Step #34 the wires are cut in the following manner. A valve solenoid 645 is energized to operate the air cylinder 315 to actuate the cutter mechanisms 47—47 When the wires have been cut, a microswitch 650 is tripped by the opposite end of the piston rod of the air cylinder 315 (FIG. 27) to reenergize the stepper coil and advance the wipers through Step #35 to Step #40. In Step #40, if the machine is in the manual mode as determined by a preset switch 655, the cycle will stop here until the start button 555 is pressed driving the stepper to position 1. With the switch 655 in the automatic position, as shown in FIG. 37C, the relay K–8 is energized and holds in during the load cycle. The stepper will operate through Step #40 in the automatic operation and a complete cycle is reinitiated.

It is to be understood that the above-described methods and apparatus are merely exemplary embodiments of the invention. Various modifications and other embodiments may be made which fall within the spirit and scope of the invention.

What is claimed is:

1. In the method of winding an indefinite length of wire into successive coils wherein relative rotational and to-and-fro traversing movements are caused between a spool and a wire guide to pull the wire from a wire supply through the wire guide and wind the same in a coil on the spool, the improvement which comprises:
   interrupting the rotational and to-and-fro movements when a desired coil of the wire has been wound on the spool;
   moving the wire guide relative to the spool to form a span of wire extending from the wound coil;
   anchoring the end of said span of wire adjacent to the wire guide to a relatively fixed point; and
   severing the span of wire between said fixed point and the spool to form a lead of a predetermined length for the coil wound on the spool, the new leading end of the wire supply extending from the wire guide and remaining anchored to the fixed point preparatory to winding a subsequent coil.

2. The method according to claim 1 wherein the anchoring step comprises wrapping said end of the span of wire about an anchor pin.

3. The method according to claim 2 wherein the wrapping of said end of the span of wire on the anchor pin is accomplished by revolving the wire guide and anchor pin relative to one another.

4. The method of winding an indefinite length of wire from a wire supply into coils on successive spools, each spool having at least one flange provided with strand-engaging means formed thereon, which method comprises:
   threading the leading end of the wire from the supply through a wire guide;
   fastening the leading end of the wire to an anchor pin at a relatively fixed position spaced a predetermined distance from a spool;
   moving the wire guide from a position adjacent to the anchor pin to a position adjacent to the flange on the spool to form a first span of wire extending between the anchor pin and the spool;
   rotating the spool about its axis to cause engagement of the wire at a point adjacent to the wire guide whereupon successive increments of the wire are pulled through the wire guide from the wire supply and wound on the spool, the rotation of the spool causing the first span of wire to break between the fixed anchor pin and the spool leaving an extending lead-in portion;
   continuing the rotation of the spool until a coil of a desired number of turns is wound on the spool;
   stopping the rotation of the spool;
   moving the wire guide away from the spool to a position immediately adjacent the anchor pin to form a second span of wire extending between the spool and the anchor pin;
   fastening to the anchor pin the end of said second span of wire adjacent to the wire guide;
   severing the second span of the wire between the anchor pin and the spool to form an extending lead-out portion of the finished coil, the new leading end of the wire remaining anchored to the anchor pin preparatory to winding a subsequent coil on a replacement spool; and
   replacing the spool having the finished coil thereon with another empty spool and repeating the foregoing steps beginning with the moving of the wire to form the first span.

5. The method of winding an indefinite length of wire from a wire supply into successive coils, each coil being provided with extending lead-in and lead-out portions, which method comprises:
   anchoring the leading end of the wire, which extends through a wire guide from a wire supply, at a fixed location spaced a predetermined distance from a spool;
   moving the wire guide from a position adjacent to said fixed location to a position adjacent to the spool to form a first span of wire extending between said fixed location and the spool;
   rotating the spool about its axis and causing engagement of the wire by the spool at a point adjacent to the wire guide whereupon additional wire is pulled through the wire guide from the wire supply and wound on the spool, the rotation of the spool causing the first span of wire to break between the fixed location and the spool leaving an extending lead-in portion;
   continuing the rotation of the spool until a desired coil of the wire is wound on the spool;
   stopping the rotation of the spool;
   returning the wire guide to said fixed location to form a second span of wire extending between the spool and said fixed location;
   anchoring the end of said second span of wire adjacent to the wire guide at said fixed location; and
   severing the second span of the wire between said fixed location and the spool to form an extending lead-out portion of the coil, the new leading end of the wire remaining anchored at said fixed location preparatory to winding a subsequent coil.

6. The method according to claim 5 wherein the anchoring steps include wrapping the wire about an anchor pin by revolving the wire guide and anchor pin relative to one another.

7. The method according to claim 5 wherein an intermediate portion of the first span of wire is wrapped about a pin spaced a predetermined distance from, but rotatable with the spool so that the first span breaks between the fixed location and the pin upon subsequent rotation of the spool.

8. The method of winding an indefinite length of wire from a wire supply into successive coils, each coil being provided with extending lead-in and lead-out portions, which comprises:

mounting a spool on a rotatable arbor;
threading the leading end of the wire from the supply through a wire guide;
fastening the leading end of the wire to a first pin located at a stationary point adjacent to the arbor;
moving the wire guide from a position adjacent to the first pin to a position adjacent to a second pin mounted on the arbor and located a predetermined distance from the spool;
fastening the wire to the second pin;
moving the wire guide from a position adjacent to the second pin to a position immediately adjacent to the spool to form a span of wire extending between the second pin and the spool;
rotating the arbor and the spool to cause engagement of the wire on the spool whereupon successive increments of the wire are pulled through the wire guide and are wound on the spool, the rotation of the arbor causing the wire extending between the first and second pins to be strained and broken, an end of the wire remaining attached to the second pin;
stopping the rotation of the arbor and spool when a desired coil of wire has been formed on the spool;
returning the wire guide to a position adjacent to the first pin to form a span of the wire extending from the spool to the first pin;
attaching the adjacent end of the last-mentioned span of wire to the first pin; and
severing the last-mentioned span between the first pin and the spool, the new leading end of the wire extending from the wire guide remaining attached to the first pin preparatory to winding a subsequent coil.

9. The method according to claim 8 wherein the rotation of the arbor and spool is stopped so that the arbor and spool are displaced 180° from the position assumed immediately prior to the rotation thereof.

10. Apparatus for winding wire from a wire supply into a coil on a spool, which comprises:

a wire guide for directing the wire;
means for mounting a spool and the wire guide for relative rotation about the axis of the spool;
anchor means mounted in predetermined spaced relationship with respect to the spool;
drive means for rotating the spool and the wire guide relative to one another to pull the wire past the wire guide and wind the same on the spool to form a coil of wire thereon when the wire guide is positioned adjacent to the spool;
means for interrupting the winding of the wire on the spool and for moving the wire guide from a position adjacent to the spool to a position adjacent to the anchor means so that a span of wire is formed between the spool and the anchor pin;
means for attaching the adjacent end of said span of wire to the anchor means; and
means for breaking said span of wire between the anchor means and the spool, the newly formed leading end of the wire extending past the wire guide remaining attached to the anchor means.

11. Apparatus for winding wire from a wire supply into a coil on a spool, which comprises:

a wire guide for receiving and directing the wire;
means for mounting a spool and the wire guide for relative rotation about the axis of the spool;
an anchor pin mounted at a fixed position spaced a predetermined distance from the spool;
drive means for rotating the spool and the wire guide relative to one another to pull the wire past the wire guide and wind the same on the spool to form a coil of wire thereon when the wire guide is positioned adjacent to the spool;
means for interrupting the winding of the wire on the spool and for moving the wire guide from a position adjacent to the spool to a position adjacent to the anchor means so that a span of wire is formed between the spool and the anchor pin;
means for wrapping the adjacent end of said span of wire about the anchor pin; and
means for breaking said span of wire between the anchor pin and the spool, the newly formed leading end of the wire extending past the wire guide remaining attached to the anchor pin.

12. Apparatus according to claim 11 wherein the means for wrapping the wire to the anchor pin comprises means for revolving the anchor pin and the wire guide relative to one another about the axis of the anchor pin.

13. Apparatus according to claim 12 wherein the wire guide comprises a tubular guide element through which the wire is pulled from the wire supply.

14. In apparatus for winding coils on spools including a rotatable arbor for supporting a spool, a wire guide through which wire is directed, means for rotating the spool to pull wire through the wire guide onto the spool and means normally operating to cause relative to-and-fro movement between the spool and the wire guide to distribute convolutions of the wire across a winding surface of the spool, the improvement which comprises:

an anchor pin positioned at a fixed location spaced a predetermined distance from the arbor and the spool,
means operated after a predetermined number of convolutions have been placed on the spool for stopping the rotation of the arbor and the to-and-fro movement of the wire guide,
means for moving the wire guide relative to the anchor pin to position one immediately adjacent to the other,
means for revolving the wire guide relative to the anchor pin to cause a length of the wire to be wrapped about the anchor pin, and
means for severing said last-mentioned length between the anchor pin and the spool to form a lead for the coil wound on the spool.

15. Apparatus for winding wire from a wire supply into coils on spools, which comprises:

a frame;
a rotatable arbor mounted on the frame and designed to support a spool for rotation about the spool axis;
a wire guide through which the wire is threaded and directed;
means for mounting the wire guide for movement relative to the frame;
an anchor pin mounted on the frame and spaced from the spool supported by the arbor, the wire guide being initially positioned immediately adjacent to the anchor pin with an end portion of the wire extending through the wire guide and being wrapped about the anchor pin to attach the wire thereto;
an arbor pin mounted on the arbor and spaced a predetermined distance from the winding surface of the spool;
means for moving the wire guide from its initial position adjacent to the anchor pin to a position adjacent to the arbor pin, the wire being pulled through the wire guide to form a span extending therebetween;
means for revolving the wire guide about the axis of the arbor pin to wrap the wire thereabout;
means for moving the wire guide from its position adjacent to the arbor pin to a position adjacent to the spool;
means operated, when the wire guide is in the position adjacent to the spool, for rotating the spool and causing engagement of the wire by the spool so that as the rotation of the spool continues successive increments of the wire are drawn through the wire guide and wound into a coil on the winding surface of the spool, the span of wire extending between the anchor pin and the arbor pin being broken upon rotation of the arbor to leave a predetermined lead-in portion of the wire extending from the coil, the adjacent end of said lead-in portion remaining wrapped about the arbor pin;

means for interrupting the winding of the coil on the spool and for moving the wire guide from a position adjacent to the spool to a position adjacent to the anchor pin to form another span of the wire extending between the spool and the anchor pin;

means for revolving the wire guide about the axis of the anchor pin to wrap the adjacent end of said last-mentioned span of wire thereto; and means for breaking said last-mentioned span to form a lead-out portion of a predetermined length for the coil wound on the spool.

16. Apparatus according to claim 15 wherein the arbor pin projects outwardly from the arbor, said arbor pin comprising a root portion attached to the arbor, an intermediate portion and a free end portion, said root portion having a generally polygonal cross section for initially receiving and holding turns of wire wrapped about the arbor pin, said intermediate portion having a section of a size and configuration such that the turns placed on the root portion will fit relatively loosely on the intermediate portion when thrown outwardly from the root portion onto the intermediate portion by the centrifugal forces produced by the rotation of the arbor, and said free end portion having an enlarged cross section of a size sufficiently large to prevent the turns thrown onto the intermediate portion from being thrown completely off the arbor pin.

17. Apparatus according to claim 15 wherein the means for mounting the wire guide for movement relative to the frame includes a first carriage movable in a first direction, a second carriage carried by the first carriage and movable in a second direction substantially perpendicular to said first direction, said first and second directions lying in a plane substantially parallel to the spool axis, and a wrapping carriage mounted on said second carriage for revolving movement in said plane relative to the anchor pin and the arbor pin.

18. Apparatus according to claim 15 wherein the means for mounting the wire guide for movement relative to the frame includes a first carriage movable in a first direction, a second carriage movable in a second direction, said first and second directions lying in a first plane substantially parallel to the spool axis, a wrapping carriage mounted for revolving movement in said first plane relative to the arbor pin and the anchor pin, and a third carriage mounted for movement in a second plane substantially perpendicular to said first plane and the spool axis, the wire guide being mounted on one of said carriages for movement with all of the carriages.

19. Apparatus according to claim 15 wherein the means for breaking said last-mentioned span to form a lead-out portion comprises two cutter elements mounted adjacent to the anchor pin and provided with cooperating cutting edges, said last-mentioned span extending between cutting edges on the cutter elements.

20. Apparatus for winding wire from a wire supply into coils on spools, which comprises:
a rotatable arbor for supporting a spool, having a flange provided with a wire-engaging slot, for rotation about the axis of the spool;
a tubular wire guide through which the wire is threaded and directed;
an anchor pin located at a fixed position and spaced from the spool, the wire guide being initially positioned immediately adjacent to the anchor pin with the leading end of the wire extending through the wire guide and being wrapped about the anchor pin to attach the wire thereto;
an arbor pin mounted on the arbor substantially perpendicular to the rotational axis of the spool and a predetermined distance from the spool;
means for moving the wire guide from its initial position adjacent to the anchor pin to a position adjacent to the arbor pin, the wire being pulled through the wire guide to form a first span extending therebetween;
means for revolving the wire guide about the axis of the arbor pin to wrap the wire thereabout;
means for indexing the wire guide from its position adjacent to the arbor pin to a position adjacent to the slot in the flange of the spool;
means operated, when the wire guide is in a position adjacent to the slot in the flange of the spool, for rotating the arbor and causing engagement of the wire by the wire-engaging slot so that, as the rotation of the spool continues, successive increments of the wire are pulled through the wire guide and wound into a coil by the spool, the span of wire extending between the anchor pin and the arbor pin being broken upon rotation of the arbor to leave a predetermined lead-out portion of the wire extending from the coil, the adjacent end of said lead-out portion remaining wrapped on the storage pin;
means for moving the wire guide to and fro with respect to the winding surface of the spool to distribute the wire into layers on the spool;
means for stopping the rotation of the arbor when a coil of a desired number of turns has been wound on the spool;
means operated, when the rotation of the arbor is stopped, for moving the wire guide from a position adjacent to the spool to a position adjacent to the anchor pin to form a second span of the wire extending between the spool and the anchor pin;
means for revolving the wire guide about the axis of the anchor pin to wrap the adjacent end of said second span of wire thereto; and
means for cutting said second span to form a lead-out portion of a predetermined length for the coil wound on the spool.

21. Apparatus according to claim 20 including means for applying a layer of insulating tape over the windings of the coil before the second span is formed.

22. Apparatus according to claim 20 including means operable for stripping scrap turns of wire from the anchor pin, and means for operating said stripping means after the first span breaks and before the adjacent end of the second span is wrapped about the anchor pin.

23. Apparatus according to claim 20 wherein the means for stopping the rotation of the arbor comprises:
photoelectric means for generating an electrical pulse for each rotation of the arbor;
a pulse counting circuit including a plurality of electronic counting tubes for registering the pulses;
a relay circuit operable for controlling the operation of the arbor rotating means; and
switch means connecting the counting tubes to the relay circuit, said switch means being preset to a desired pulse count so that when a coincidence occurs between the registered count on the counting tubes and the preset count on the switches, the relay circuit is operated to stop the rotation of the arbor.

24. Apparatus according to claim 15 wherein the means for mounting the wire guide for movement relative to the frame comprises:
a first carriage means movable horizontally and substantially parallel to the spool axis;
a second carriage means carried by the first carriage means and movable vertically relative to the first carriage means;

an electric drive motor operable for moving the second carriage to move the wire guide vertically relative to the spool and the frame;

a pair of spaced contact strips;

support means movable with the second carriage means, said support means holding the spaced contact strips in vertically aligned, coplanar relationships, the contact strips being insulated electrically from one another and spaced apart by a gap of a predetermined width;

a contact finger mounted at a fixed vertical position and located in the path of vertical movement of the contact strips, the contact finger being designed for sliding electrical contact with the contact strips, the width of the gap between the contact strips being at least greater than the contact area of the contact finger; and an electrical control circuit, including the contact strips and the contact finger, for controlling the operation of the drive motor, the control means being effective to energize the drive motor to move the second carriage means vertically, when the contact finger is in engagement with one or the other of the contact strips, in one direction or the other dependent upon which of said contact strips is engaged so as to move the contact strips to a position wherein the contact finger is positioned within the gap between the contact strips and out of contact with the contact strips.

25. Apparatus according to claim 24, wherein said electrical control circuit includes a switch normally in a first state to hold the drive motor energized independently of the electrical connection between a contact strip and the contact finger; and including in addition cam means driven in synchronism with the movement of the second carriage for operating the switch momentarily to a second state once during each increment of a vertical movement of the second carriage equal to the predetermined width of the gap between the contact strips, the drive motor becoming deenergized when the contact finger is positioned wholly within the gap and the switch is momentarily operated to its second state.

26. Apparatus according to claim 24 wherein additional contact fingers are provided at other discrete vertical positions, and the electrical control means includes switching means for selectively including a predetermined one of the contact fingers in the electrical control circuit.

27. A position sensor for a movable carriage, which comprises:

a pair of spaced, electrical contact strips;

means for holding the spaced contact strips in a coplanar relationship and aligned in the direction of movement of the carriage, the contact strips being electrically insulated from one another and spaced apart by a gap of a predetermined width;

means for mounting the holding means for movement with the carriage;

a contact finger mounted at a fixed position adjacent to the path of travel of the contact strips and designed for pressing and sliding electrical contact with the contact strips, the gap between the contact strips being slightly wider than the corresponding width of the contact area of the contact finger; and electrical control means including said contact finger and the contact strips for controlling the movement of the carriage to stop the carriage when the contact finger is positioned within the gap and out of contact with either of the contact strips.

References Cited by the Examiner

UNITED STATES PATENTS

| 2,154,792 | 4/1939 | Weber | 140—92.2 |
| 2,997,076 | 8/1961 | McVoy | 140—1 |
| 3,002,259 | 10/1961 | Fletcher, et al. | 29—155.5 |
| 2,228,615 | 1/1966 | Lancaster | 140—92.2 |

CHARLES W. LANHAM, *Primary Examiner.*

L. A. LARSON, *Assistant Examiner.*